United States Patent
Sleeman et al.

(10) Patent No.: US 12,197,675 B2
(45) Date of Patent: Jan. 14, 2025

(54) TOUCH-SENSITIVE APPARATUS AND METHOD

(71) Applicant: TouchNetix Limited, Fareham Hampshire (GB)

(72) Inventors: Peter Timothy Sleeman, Fareham Hampshire (GB); Stephen William Roberts, Fareham Hampshire (GB)

(73) Assignee: TouchNetix Limited, Fareham/Hampshire (GB)

( * ) Notice: Subject to any disclaimer, the term of this patent is extended or adjusted under 35 U.S.C. 154(b) by 0 days.

(21) Appl. No.: 18/567,655

(22) PCT Filed: May 27, 2022

(86) PCT No.: PCT/GB2022/051354
§ 371 (c)(1),
(2) Date: Dec. 6, 2023

(87) PCT Pub. No.: WO2022/258949
PCT Pub. Date: Dec. 15, 2022

(65) Prior Publication Data
US 2024/0272744 A1    Aug. 15, 2024

(30) Foreign Application Priority Data
Jun. 7, 2021 (GB) .................................. 2108110

(51) Int. Cl.
*G06F 3/045* (2006.01)
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC ..... G06F 3/04166; G06F 3/0446; G06F 3/044
(Continued)

(56) References Cited

U.S. PATENT DOCUMENTS

| 2014/0292709 A1 | 10/2014 | Mizuhashi |
| 2015/0355765 A1 | 12/2015 | Fukushima |

(Continued)

FOREIGN PATENT DOCUMENTS

| EP | 2613221 A2 | 7/2013 |
| EP | 3800534 A1 | 4/2021 |
| GB | 2584669 A | 12/2020 |

OTHER PUBLICATIONS

Combined Search and Examination Report issued by the United Kingdom Intellectual Property Office for priority United Kingdom Application No. 2108110.4, issued Feb. 17, 2022.
(Continued)

*Primary Examiner* — Thuy N Pardo
(74) *Attorney, Agent, or Firm* — Renner, Otto, Boisselle & Sklar, LLP

(57) ABSTRACT

Described is a touch-sensitive apparatus including a plurality of drive electrodes and control circuitry is configured to: apply time-varying voltage signal(s) to groups of neighbouring drive electrodes for a first time period; perform a first measurement on a receiver electrode during the first time period; apply time-varying voltage signal(s) groups of neighbouring drive electrodes for a second time period; perform a second measurement on the receiver electrode during the second time period; and determine a resultant signal corresponding to the mutual capacitance between the first group of neighbouring drive electrodes and the receiver electrode based on both the first measurement and the second measurement. Further described is a corresponding method for determining the presence of a touch on a touch-sensitive element.

18 Claims, 10 Drawing Sheets

(58) Field of Classification Search
USPC .......................................... 345/174, 173, 156
See application file for complete search history.

(56) References Cited

U.S. PATENT DOCUMENTS

| | | | |
|---|---|---|---|
| 2016/0070413 A1* | 3/2016 | Geaghan ............. | G06F 3/04186 345/174 |
| 2018/0275442 A1 | 9/2018 | Kurasawa | |
| 2019/0101999 A1 | 4/2019 | Amer | |

OTHER PUBLICATIONS

International Search Report and Written Opinion issued for priority International Application No. PCT/GB2022/051354, mailed Sep. 6, 2022.

* cited by examiner

TOUCH-SENSITIVE APPARATUS AND METHOD

This application is a national phase of International Application No. PCT/GB2022/051354, filed May 27, 2022, which claims priority to United Kingdom Application No. 2108110.4, filed Jun. 7, 2021, each of which is hereby incorporated herein by reference in its entirety.

BACKGROUND OF THE INVENTION

The present invention relates to the field of touch sensors, for example touch sensors for overlying a display screen to provide a touch-sensitive display (touch screen). In particular, embodiments of the invention relate to techniques for measuring the mutual capacitance at a plurality of intersections between drive electrodes and receive electrodes for sensing the presence of one or more touching objects within a two-dimensional sensing area.

A capacitive touch sensor can be generalised as one that uses a physical sensor element comprising an arrangement of electrically conductive electrodes extending over a touch sensitive area (sensing area) to define sensor nodes (or intersection points) and controller circuitry connected to the electrodes and operable to measure changes in the electrical capacitance of each of the electrodes or the mutual-capacitance between combinations of the electrodes. The electrodes are typically provided on a substrate.

For capacitive touch sensors in which the mutual capacitance is measured between combinations of electrodes, to perform a complete scan of the mutual capacitance over the touch sensitive surface, each intersection (or combination) of electrodes must be individually measured. Touch sensors can be measured in accordance with at least two characteristics, namely the sensitivity of the touch sensor (i.e., how easily the touch sensor can detect a touch) and the responsiveness of the touch sensor (i.e., how quickly the touch sensor can detect/register a touch on the sensing surface from the moment a touch is present). In mutual capacitance measurement techniques, the sensitivity is broadly proportional to the time taken to measure the mutual capacitance at each intersection point between combinations of electrodes—generally, the greater the measurement time period, the better the sensitivity. Conversely, the responsiveness is broadly proportional to the time required to measure the mutual capacitance at all the intersection points of an electrode array—generally, the shorter the time, the better the responsiveness.

Most applications for touch sensors require both good sensitivity and good responsiveness, but as evident from above, a balance must be struck between the two parameters. One way to help improve the sensitivity and/or responsiveness is to employ faster electronics which can sample a signal (the mutual capacitance) at a higher sample rate. However, faster electronics are usually expensive and may be relatively large, and are thus are not practical for commercial applications.

There is therefore a desire to provide touch sensors which can offer an improvement in responsiveness and/or sensitivity in detecting touches.

SUMMARY OF THE INVENTION

According to a first aspect of the invention there is provided a touch-sensitive apparatus, the apparatus including: a plurality of drive electrodes; a receiver electrode; drive circuitry configured to generate a first time-varying voltage signal and a second time-varying voltage signal, wherein the first and second time-varying voltage signals are the inverse of one another; and control circuitry configured to: apply at least one of the first time-varying voltage signal and the second time-varying voltage signal to a first group of neighbouring drive electrodes for a first time period; apply at least one of the first time-varying voltage signal and the second time-varying voltage signal to a second group of neighbouring drive electrodes for the first time period; perform a first measurement on the receiver electrode during the first time period; apply at least one of the first time-varying voltage signal and the second time-varying voltage signal to the first group of neighbouring drive electrodes for a second time period; apply at least one of the first time-varying voltage signal and the second time-varying voltage signal to the second group of drive electrodes for the second time period, wherein the time-varying voltage signal applied to at least one of the first group and second group of neighbouring drive electrodes during the first time period is different from the time-varying voltage signal applied to the at least one of the first group and second group of neighbouring drive electrodes during the second time period; perform a second measurement on the receiver electrode during the second time period; and determine a resultant signal corresponding to the mutual capacitance between the first group of neighbouring drive electrodes and the receiver electrode based on both the first measurement and the second measurement.

According to a second aspect of the invention there is provided a system comprising the touch-sensitive apparatus of the first aspect, further comprising system processing circuitry communicatively coupled to the processing circuitry of the touch-sensitive apparatus.

According to a third aspect of the invention there is provided a method for determining the presence of a touch on a touch-sensitive element of a touch-sensitive apparatus, the apparatus comprising a plurality of drive electrodes, and a receiver electrode, wherein the method comprises: generating a first time-varying voltage signal and a second time-varying voltage signal, wherein the first and second time-varying voltage signals are the inverse of one another; applying at least one of the first time-varying voltage signal and the second time-varying voltage signal to a first group of neighbouring drive electrodes for a first time period; applying at least one of the first time-varying voltage signal and the second time-varying voltage signal to a second group of neighbouring drive electrodes for the first time period; performing a first measurement on the receiver electrode during the first time period; applying at least one of the first time-varying voltage signal and the second time-varying voltage signal to the first group of neighbouring drive electrodes for a second time period; applying at least one of the first time-varying voltage signal and the second time-varying voltage signal to the second group of drive electrodes for the second time period, wherein the time-varying voltage signal applied to at least one of the first group and second group of neighbouring drive electrodes during the first time period is different from the time-varying voltage signal applied to the at least one of the first group and second group of neighbouring drive electrodes during the second time period; performing a second measurement on the receiver electrode during the second time period; and determining a resultant signal corresponding to the mutual capacitance between the first group of neighbouring drive electrodes and the receiver electrode based on both the first measurement and the second measurement.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

The invention is now described by way of example only with reference to the following drawings in which.

DETAILED DESCRIPTION

Broadly speaking, the present invention relates to improvements in a mutual capacitance type touch sensitive apparatus which uses a mutual capacitance measurement technique to measure (directly or indirectly) the mutual capacitances at intersections between transmit electrodes and receive electrodes of an electrode array forming a touch sensitive element. More specifically, the present invention applies combinations of a first time-varying voltage signal and a second time-varying voltage signal (which are the inverse of one another) at any one time to pairs of the drive electrodes of the electrode array (or a sub-set thereof) and measures the resulting signal at the receive electrode(s). By applying different combinations of the first and second voltage signals to the pairs of electrodes at different time periods, and making measurements of the resultant signals, the touch sensitive apparatus can obtain data relating to the mutual capacitance at each of the intersection points simultaneously. Moreover, applying the same signal to pairs of drive electrodes has been shown in increase the relative signal that is achievable subsequently boosting the signal to noise ratio. Accordingly, using the techniques of the present invention, the sensitivity and/or responsiveness of the touch sensitive apparatus can be improved.

Figure 1:
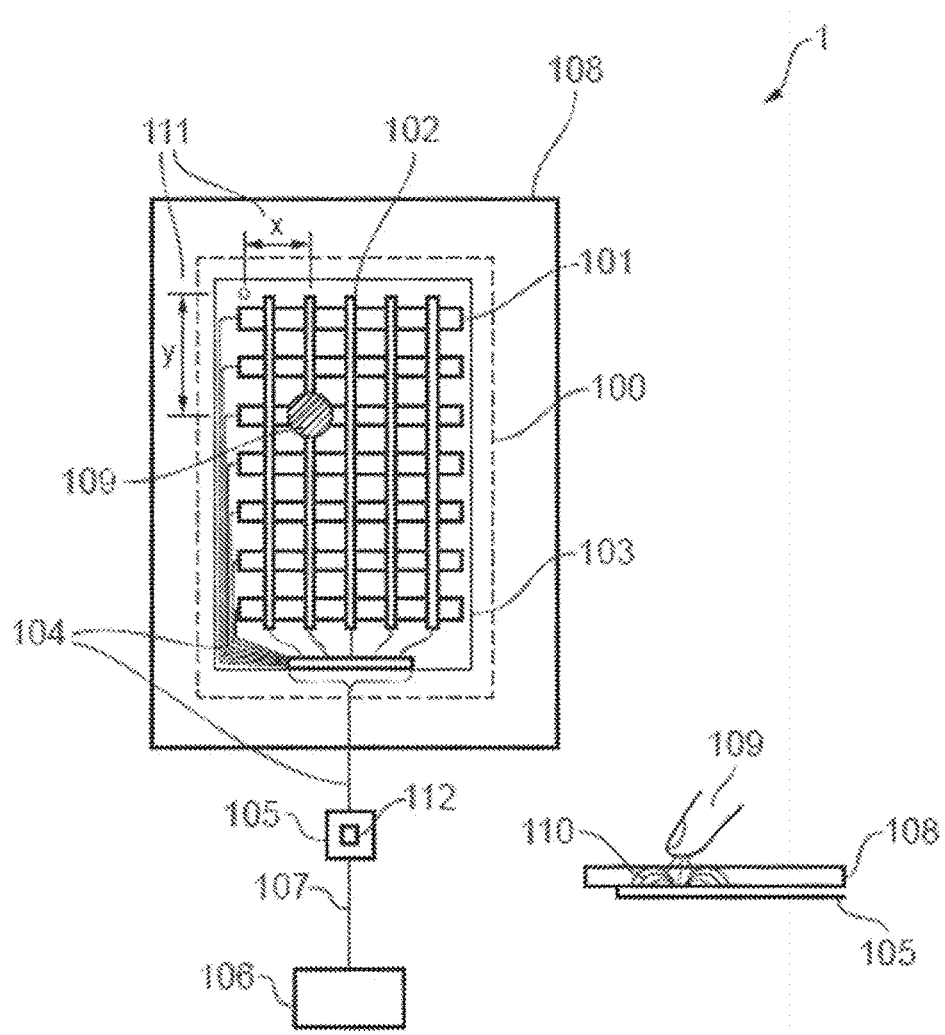
FIG. 1 schematically illustrates a touch sensitive apparatus in accordance with certain embodiments of the invention.

FIG. 1 schematically shows a touch-sensitive apparatus 1 in accordance with the principals of the present disclosure. The touch-sensitive apparatus 1 is represented in plan view (to the left in the figure) and also in cross-sectional view (to the right in the figure).

The touch-sensitive apparatus 1 comprises a sensor element 100, measurement circuitry 105, processing circuitry 106, and cover 108. The sensor element 100 and cover 108 may, more generally be referred to as a touch screen or touch-sensitive element of the touch-sensitive apparatus 1, while the measurement circuitry 105 and processing circuitry 106 may, more generally, be referred to as the controller of the touch-sensitive apparatus 1.

The touch screen is primarily configured for establishing the position of a touch within a two-dimensional sensing area by providing Cartesian coordinates along an X-direction (horizontal in the figure) and a Y-direction (vertical in the figure). In this implementation, the sensor element 100 is constructed from a substrate 103 that could be glass or plastic or some other insulating material and upon which is arranged an array of electrodes consisting of multiple laterally extending parallel electrodes, X-electrodes 101 (row electrodes), and multiple vertically extending parallel electrodes, Y-electrodes 102 (column electrodes), which in combination allow the position of a touch 109 to be determined. To clarify the terminology, and as will be seen from FIG. 1, the X-electrodes 101 (row electrodes) are aligned parallel to the X-direction and the Y-electrodes 102 (column electrodes) are aligned parallel to the Y-direction. Thus the different X-electrodes allow the position of a touch to be determined at different positions along the Y-direction while the different Y-electrodes allow the position of a touch to be determined at different positions along the X-direction. That is to say in accordance with the terminology used herein, the electrodes are named (in terms of X- and Y-) after their direction of extent rather than the direction along which they resolve position. Furthermore, the electrodes may also be referred to as row electrodes and column electrodes. It will however be appreciated these terms are simply used as a convenient way of distinguishing the groups of electrodes extending in the different directions. In particular, the terms are not intended to indicate any specific electrode orientation. In general the term "row" will be used to refer to electrodes extending in a horizontal direction for the orientations represented in the figures while the terms "column" will be used to refer to electrodes extending in a vertical direction in the orientations represented in the figures. The X-electrodes 101 and Y-electrodes 102 define a sensing (or sense) area, which is a region of the substrate 103 which is sensitive to touch.

In some cases, each electrode may have a more detailed structure than the simple "bar" structures represented in FIG. 1, but the operating principles are broadly the same. The sensor electrodes are made of an electrically conductive material such as copper or Indium Tin Oxide (ITO). The nature of the various materials used depends on the desired characteristics of the touch screen. For example, a touch screen may need to be transparent, in which case ITO electrodes and a plastic substrate are common. On the other hand a touch pad, such as often provided as an alternative to a mouse in laptop computers is usually opaque, and hence can use lower cost copper electrodes and an epoxy-glass-fibre substrate (e.g. FR4).

Referring back to FIG. 1, the electrodes 101, 102 are electrically connected via circuit conductors 104 to measurement circuitry 105, which is in turn connected to processing circuitry 106 by means of a circuit conductors 107. The measurement circuitry 105 and/or the processing circuitry 106 may each be provided by a (micro)controller, processor, ASIC or similar form of control chip. Although shown separately in FIG. 1, in some implementations, the measurement circuitry and the processing circuitry may be provided by the same (micro)controller, processor, ASIC or similar form of control chip. The measurement circuitry 105 and/or the processing circuitry 106 may be comprised of a printed circuit board (PCB), which may further include the various circuit conductors 104, 107. The measurement circuitry 105 and the processing circuitry 106 may be formed on the same PCB, or separate PCBs. Note also that the functionality provided by either of the measurement circuitry 105 and the processing circuitry 106 may be split across multiple circuit boards and/or across components which are not mounted to a PCB. The processing circuitry 106 interrogates the measurement circuitry 105 to recover the presence and coordinates of any touch or touches present on, or proximate to, the sensor element 100.

Generally speaking, the measurement circuitry 105 is configured to perform capacitance measurements associated with the electrodes 101, 102 (described in more detail below). The measurement circuitry 105 comprises drive circuitry 112 for generating electrical signals for performing the capacitance measurements. The measurement circuitry 105 outputs the capacitance measurements to the processing circuitry 106, which is arranged to perform processing using the capacitance measurements. The processing circuitry 106 may be configured to perform a number of functions, but at the very least is configured to determine when a touch 109, caused by an object such a human finger or a stylus coming into contact with (or being adjacent to) the sense area of the sensor element 100 with appropriate analysis of relative changes in the electrodes' measured capacitance/capacitive coupling. This determination process is described in more detail below. The processing circuitry 106, as in the described implementation, may also be configured to, with appropriate analysis of relative changes in the electrodes' measured capacitance/capacitive coupling, calculate a touch position on the cover's surface as an X-Y coordinate 111.

In the example, a front cover (also referred to as a lens or panel) 108 is positioned in front of the substrate 103 and a single touch 109 on the surface of the cover 108 is schematically represented. Note that the touch itself does not generally make direct galvanic connection to the sensor 103 or to the electrodes 102. Rather, the touch influences the electric fields 110 that the measurement circuitry 105 generates using the electrodes 102 (described in more detail below).

Figure 2:
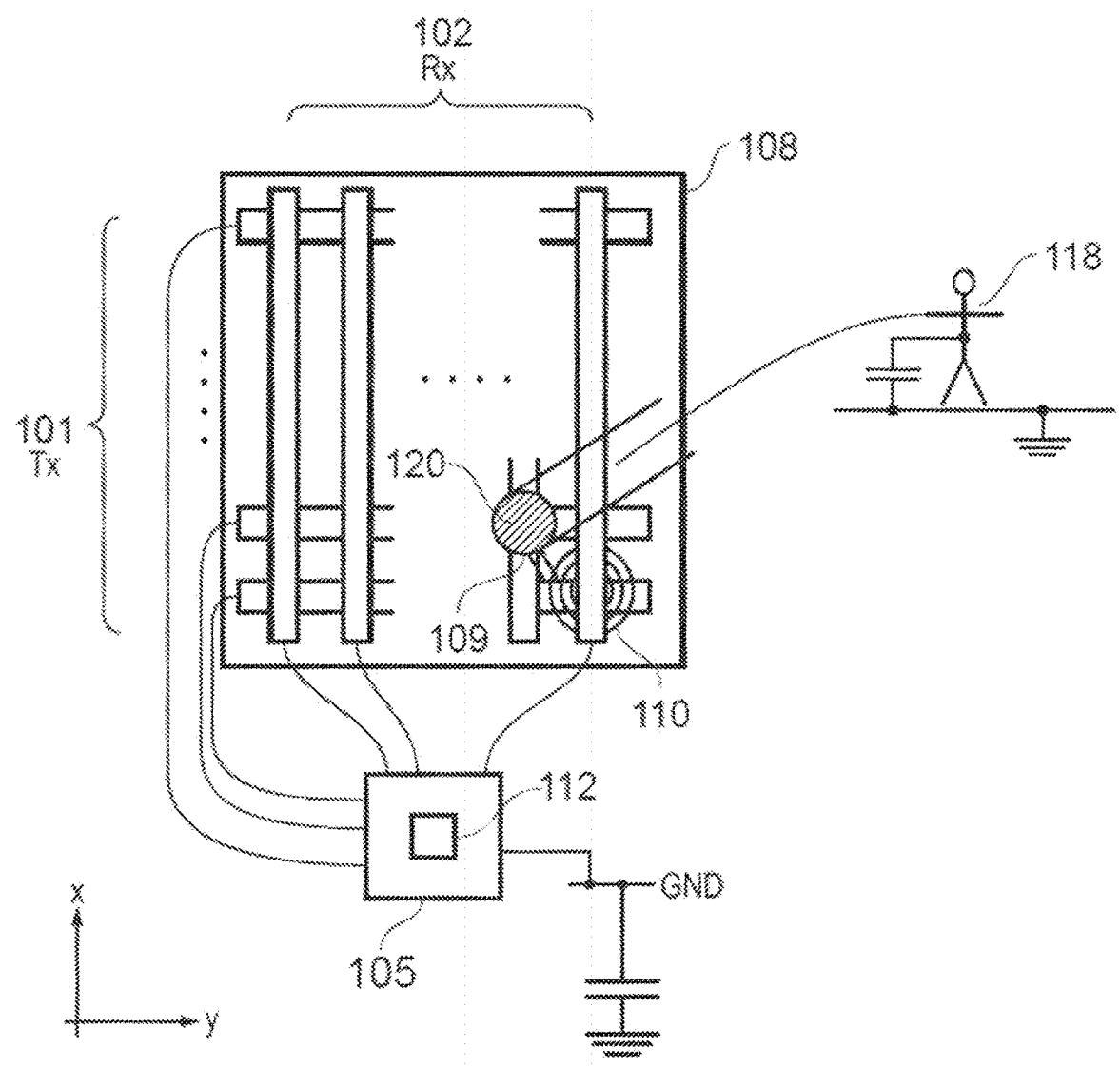
FIG. 2 schematically illustrates the mutual-capacitance type a touch sensitive apparatus of FIG. 1 in more detail, specifically with a view to explaining the principles of mutual capacitance measurement.

The measurement circuitry 105 of the described implementation is configured to measures the capacitance of the electrodes using a technique that is based on measuring what is frequently referred to as "mutual-capacitance". Reference is made to FIG. 2. In FIG. 2, the drive circuitry 112 of the measurement circuitry 105 is configured to generate and apply an electrical stimulus (drive signal) 113 to sequentially stimulate each of an array of transmitter (driven/drive) electrodes, shown as the X electrodes 101 in FIG. 2, that are coupled by virtue of their proximity to an array of receiver electrodes, shown as the Y electrodes 102 in FIG. 2. (It should be appreciated that the Y electrodes 102 may instead be the transmitting electrodes and the X electrodes 101 may instead be the receiving electrodes in other implementations). The resulting electric field 110 is now directly coupled from the transmitter to each of the nearby receiver electrodes. This is in contrast to systems which employ a technique that measure the "self-capacitance" of an electrode. The area local to and centred on the intersection of a transmitter and a receiver electrode is typically referred to as a "node" or "intersection point". Now, on application or approach of a conductive element such as a human finger, the electric field 110 is partly diverted to the touching object. That is, some of the field couples via the finger through the connected body 118, through free space and back to the measurement circuitry 105. An extra return path to the measurement circuitry 105 is hence established via the body 118 and "free-space". However, because this extra return path acts to couple the diverted field directly to the measurement circuitry 105, the amount of field coupled to the nearby receiver electrode 102 decreases. This is measured by the measurement circuitry 105 as a decrease in the "mutual-capacitance" between that particular transmitter electrode and receiver electrodes in the vicinity of the touch 109. The measurement circuitry 105 senses this change in capacitance of one or more nodes. For example, if a reduction in capacitive coupling to a given Y-electrode is observed while a given X-electrode is being driven, it may be determined there is a touch in the vicinity of where the given X-electrode and given Y-electrode cross, or intersect, within the sensing area of the sensor element 100. The magnitude of a capacitance change is nominally proportional to the area 120 of the touch (although the change in capacitance does tend to saturate as the touch area increases beyond a certain size to completely cover the nodes directly under the touch) and weakly proportional to the size of the touching body (for reasons as described above). The magnitude of the capacitance change also reduces as the distance between the touch sensor electrodes and the touching object increases.

Figure 3:
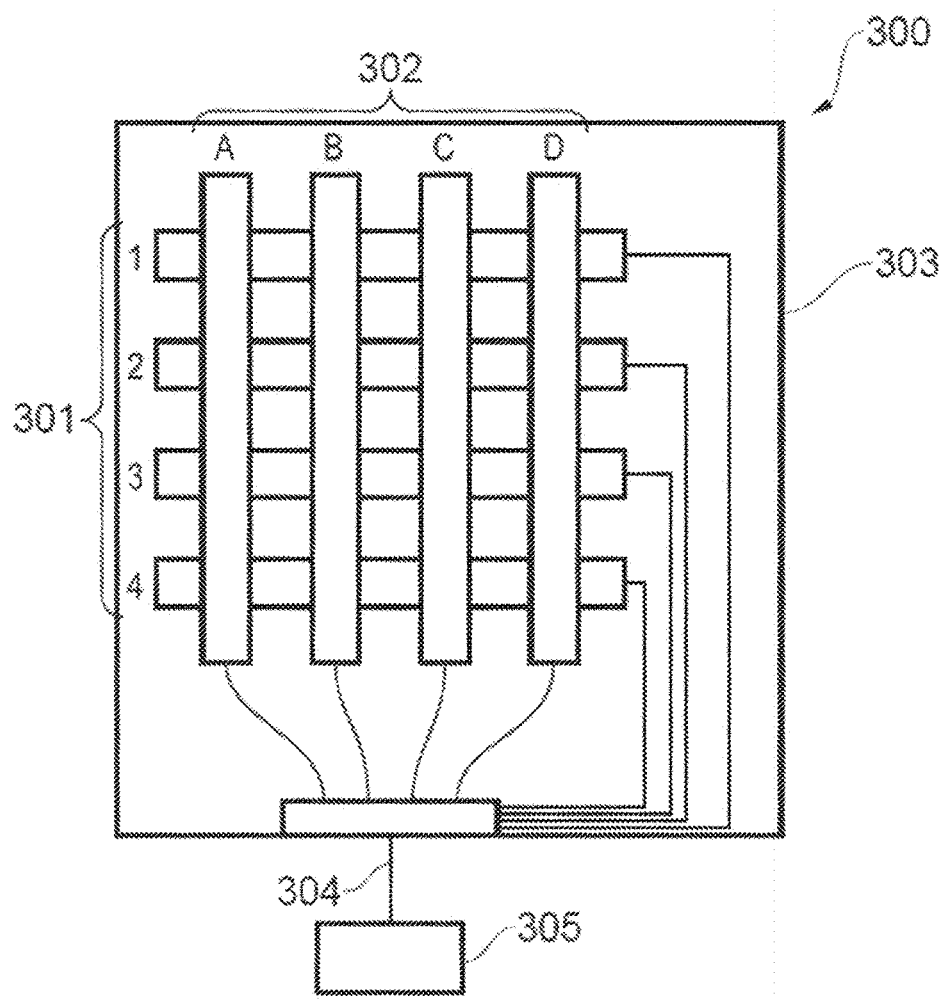
FIG. 3 schematically illustrates a conventional mutual-capacitance type touchscreen apparatus for explaining the measurement steps associated with a conventional mutual-capacitance type touchscreen.

In the described implementation, the electrodes 101, 102 are arranged on an orthogonal grid, with a first set of electrodes (e.g., the transmitter electrodes 101) on one side of a substantially insulating substrate 103 and the other set of electrodes (e.g., the receive electrodes 102) on the opposite side of the substrate 103 and oriented at substantially 90° to the first set. This is as schematically shown in FIG. 3. In other implementations, the electrodes may be oriented at a different angle (e.g., 30°) relative to one another. In addition, it should also be appreciated that it is also possible to provide structures where the grid of electrodes is formed on a single side of the substrate 103 and small conductive bridges are used to allow the two orthogonal sets of electrodes to cross each other without short circuiting. However, these designs are more complex to manufacture and less suitable for transparent sensors. Regardless of the arrangement of the electrodes, broadly speaking, one set of electrodes is used to sense touch position in a first axis that we shall call "X" and the second set to sense the touch position in the second orthogonal axis that we shall call "Y".

The mutual capacitance measurement technique offers some advantages over other techniques, such as self-capacitance measurement techniques, in that mutual capacitance measurement techniques can identify mutual capacitance changes independently at each of the electrode intersection points. This means that the mutual capacitance technique lends itself to applications which require the detection of multiple touches as inputs to associated apparatuses (such as a PC or other computing device running a software application). However, the mutual capacitance technique is generally not as sensitive to touches as other techniques such as self-capacitance measurement techniques, partly due to the fact that sources of noise have a much more significant impact in the mutual capacitance measurement techniques. What this means is that it may be more difficult when using mutual capacitance measurement techniques to correctly identify a touch as genuine (i.e., resulting from a user touching the touch sensitive element) as opposed to a source of noise. In addition, in order to increase the sensitivity, a greater sample time is required for sampling the signal (i.e., the measured mutual capacitance). However, increasing the sample time to increase the ability of the touch sensor to sense a genuine touch (i.e., improve sensitivity) generally increases the response time of the system (i.e., how quickly the touch-sensitive apparatus responds (outputs an indication that a touch is detected) when a touch is first placed on the touch-sensitive present). A balancing of these two considerations is a part of what drives the design of mutual capacitance measurement based touch sensors.

FIG. 3 shows an example touch-sensitive apparatus 301 for the purposes of explaining the issues associated with a mutual capacitance measurement technique described above. The touch-sensitive apparatus 300 includes X-direction electrodes 301, Y-direction electrodes 302, an insulating substrate 303 on which the Y electrodes 302 are arranged on one side and the X-direction electrodes are arranged on the other side, connectors 304 which electrically connect the electrodes 301 and 302 to measurement circuitry 305. Other features which are not directly relevant to the example description are omitted for clarity. The electrodes 301, 302, substrate 303, and conductors 304 may be broadly similar to electrodes 101, 102, substrate 103 and conductors 104 described in conjunction with FIG. 1 above, and a specific description of these features is omitted here.

In order to aid explanation, each of the eight electrodes 301 and 302 shown is given an identifier. The four electrodes 301 (those that extend spatially in the X direction) are given the identifiers 1 to 4, while the four electrodes 302 (those that extend spatially in the Y direction) are given the identifiers A to D. The electrodes 301 and 302 in this implementation are orthogonal to one another and spatially intersect at various locations in the X-Y plane (although do not intersect in the Z axis), and these points are herein referred to as intersection points. The various intersection points are denoted according to combinations of the identifiers of the corresponding electrodes 301 and 302. For example, the intersection of electrode A and electrode 1 is denoted as intersection point A1, the intersection of electrode B and electrode 2 is denoted as intersection point B2, etc. It should be understood that each of the intersection points corresponds to a position in the X-Y plane of the touch-sensitive element. In other words, the intersection points can be translated into two-dimensional Cartesian coordinates on the surface of the touch-sensitive element.

In accordance with the mutual capacitance measurement technique, each of the drive electrodes 301 is driven, sequentially, with a drive signal. In other words, the measurement circuitry 305 applies a drive signal to electrode 1 for a first time period, then to electrode 2 for a second time period once the first time period has elapsed, then to electrode 3 for a third time period once the second time period has elapsed, and finally to electrode 4 for a fourth time period once the third time period has elapsed. The first, second, third and fourth time periods are of the same duration, T. When the measurement circuitry 305 is applying the drive signal to one of the electrodes 301, during that time period the measurement circuitry 305 sequentially couples each receive electrode 302 in turn such that the electric field generated by the transmit electrode is coupled to the measurement circuitry 305. At this time, the measurement circuitry 305 obtains a measurement indicative of the mutual capacitance at each intersection point. For example, when the electrode 1 is driven by the drive signal, the measurement circuitry sequentially couples electrode A for a fifth time period, then electrode B for a sixth time period, then electrode C for a seventh time period, and finally electrode D for an eighth time period. The fifth, sixth, seventh and eighth time periods are of the same duration and in this instance are T/4, such that the sum of the fifth, sixth, seventh and eighth time periods is equal to the time duration T. Accordingly, the measurement circuitry 305 obtains values indicative of the mutual capacitance at the intersection points A1, B1, C1, and D1. The measurement circuitry 305, after time T has elapsed, applies the drive signal to the next electrode of the transmit electrodes, i.e., electrode 2, and sequentially couples the receive electrodes A to D as described above to obtain values indicative of the mutual capacitance at intersection points A2, B2, C2, and D2. This is repeated for all drive electrodes.

If a touch is present at an intersection point, the then mutual capacitance differs from a steady state mutual capacitance, and this can be detected by any suitable processing circuitry (e.g., by comparing the difference between a steady state signal and a measured signal against a predefined threshold). In some practical systems, during the period T/4 when any of the mutual capacitances of the intersection points are being measured by measurement circuitry 305, measurement circuitry 305 is actually sampling the signal a plurality of times and determining an average value of the measurement for that time period. In cases where the time period is short, noise has more of an influence on the calculated mean value of the sampled signal, as compared to when the time period is longer. Therefore, effectively, the predetermined threshold can be set lower in instances where there is more confidence in the calculated mean value being an actual representation of the signal (in other words, when the signal to noise ratio is higher). In instances where there is less confidence in the calculated mean value being an actual representation of the signal (when the signal to noise ratio is lower), then the threshold is set relatively higher to avoid instances of noise being determined as touches. In other words, the sensitivity of the touch sensitive apparatus can be improved when the signal to noise ratio is relatively high. The signal to noise ratio generally varies as the square root of N, where N is the number of samples of the signal. Assuming that the sampling rate is fixed, then the signal to noise ratio effectively also varies as the square root of time, or using the terminology above, T/4.

Hence, while one can consider increasing T to improve signal to noise ratio (and thus sensitivity to a genuine touch), the overall time required to complete a scan of all intersection points also increases with T. In the example described, the overall time required to complete a scan is 4T. This means that the time between placing a finger or the like on the touch-sensitive element to the touch sensitive apparatus detecting the presence of the touch is up to 4T in addition to any processing time. Hence, and as described above, increasing T leads to a detrimental effect on the responsiveness of the touch sensitive apparatus, and therefore a balance between sensitivity and responsiveness is required to be struck. In practical terms, using mutual capacitance in the conventional way, the value of T is limited by the achievable sample rate using the existing circuitry.

For the sake of completeness, it should be noted that the measurement circuitry 305 may use a multiplexer to selectively apply the drive signal to the transmit electrodes 301, and/or a multiplexer to selectively connect the receive electrodes 302 to the measurement circuitry 305. This allows a single drive circuitry and single receive circuitry to be used to make all the measurements, thus decreasing the overall costs of the circuitry. However, in other arrangements, each drive electrode may be coupled to its own drive circuitry which is selectively operated, and each receive electrode may be coupled to its own receive circuitry which is selectively operated. It should be appreciated that a combination of the two approaches may also be used, for example the drive electrodes may be coupled to a multiplexer and driven sequentially, while the receive electrodes are individually coupled to corresponding receive circuitry.

Various techniques are proposed to make more efficient use of the mutual capacitance measurement technique to improve the characteristics (i.e., sensitivity and/or responsiveness) of the touch-sensitive apparatus 1 for a given sample rate.

Figure 4:
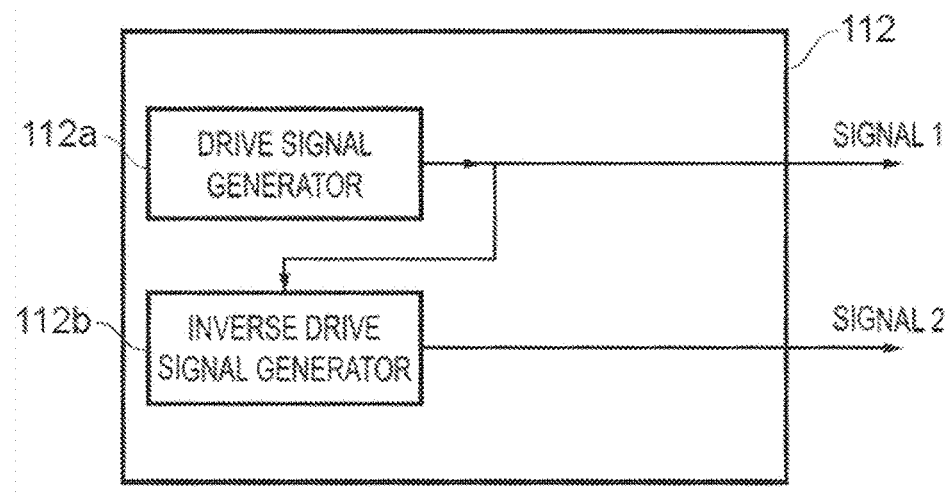
FIG. 4 schematically illustrates the drive circuitry of the touch sensitive apparatus of FIG. 1 in more detail in accordance with certain embodiments of the invention.

FIG. 4 is a highly schematic representation of the drive circuitry 112 of FIG. 1 in more detail. The drive circuitry 112 comprises a drive signal generator 112a and an inverse drive signal generator 112b. The drive signal generator 112a is configured to generate a first time-varying voltage signal, and more specifically a sine wave voltage signal. For convenience, this is referred to as signal 1. Signal 1 varies sinusoidally in accordance with a certain frequency, w, and having a certain amplitude, A. In other words, signal 1 may be represented mathematically as:

$$\text{signal } 1 = +A\sin(\omega t) \quad (1)$$

As shown in FIG. 4, signal 1 is input into inverse drive signal generator 112b. The inverse drive signal generator 112b is configured to invert signal 1 to produce a second signal, signal 2. In this instance, signal 2 is the inverse of signal 1. That is, signal 2 is a time-varying sine wave voltage signal which varies sinusoidally in accordance with the frequency, w, and has an amplitude, A, but is 180° out of phase with signal 1. In other words, when signal 1 is positive, signal 2 is negative by an equal but opposite amount. Signal 2 may be represented mathematically as:

$$\text{signal } 2 = -A\sin(\omega t) \quad (2)$$

The inverse drive signal generator 112b may be implemented using any suitable circuitry capable of inverting an input signal. Additionally, while the present implementation shows the inverse drive signal generator 112b receiving signal 1, in other implementations the inverse drive signal generator 112b may comprise similar circuitry to drive signal generator 112a but is controlled to generate an inverse signal to signal 1.

In accordance with the described implementation of FIG. 1, the measurement circuitry 105, which comprises drive circuitry 112, outputs signal 1 and signal 2 to the drive electrodes 101. More specifically, the measurement circuitry 105 is configured to output signal 1 to a first one of the driven electrodes 101 and at the same time output signal 2 to at least a second one of the driven electrodes 101, and then after a certain time period, output signal 2 to at least the first one of the driven electrodes 101 and at the same time output signal 1 to the second one of the driven electrodes 101, and so on.

FIGS. 5a to 5d exemplify these scenarios schematically using representations of the electrodes 101 and 102 of FIG. 1. Other features of FIG. 1 are omitted for reasons of clarity. More specifically, FIGS. 5a to 5d illustrate four driven electrodes 101 and a single receive electrode 102. For facilitating explanation, each of the driven electrodes has an identifier 1 to 4 (similar to as described in relation to FIG. 3).

Figure 5A:
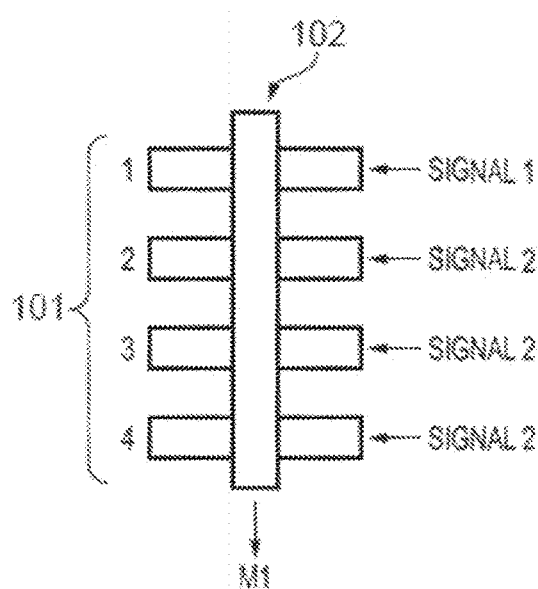
FIGS. 5a to 5d schematically illustrates a part of an electrode array of a touch sensitive apparatus for explaining an example approach to obtaining measurements indicative of mutual capacitance at intersection points of the electrode array.

Thus, the measurement circuitry is configured to apply signal 1 and signal 2 to a group of four transmit electrodes 101. Initially, the measurement circuitry 105 applies signal 1 to a first transmit electrode (electrode 1) and signal 2 to the second to fourth electrodes (electrodes 2 to 4), as shown in FIG. 5a. The signals 1 and 2 are applied for a certain time period, e.g., T/4, and during this time, the measurement circuitry 105 makes a measurement M1 using receive electrode 102. The measurement M1 is effectively a summation of each of the signals received from the intersection points of the four electrodes with the receive electrode.

Figure 5B:
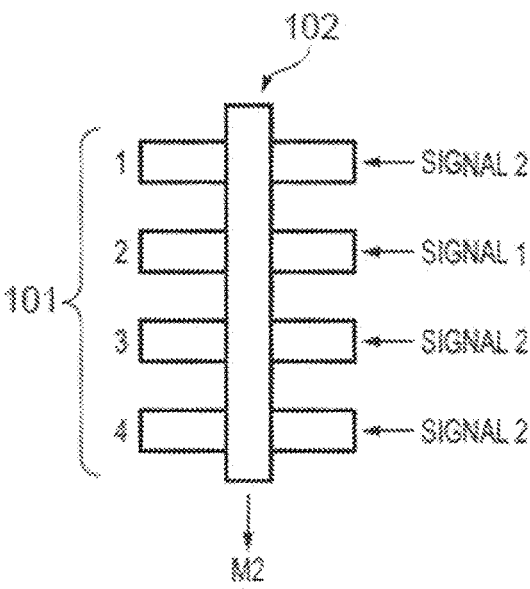
Figure 5C:
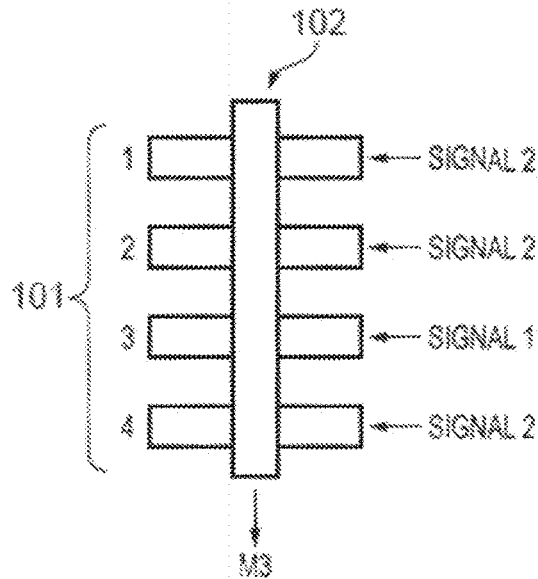
Figure 5D:
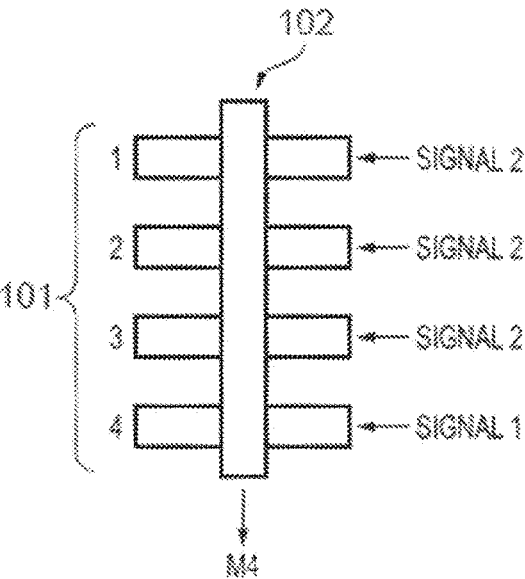

After the time T/4 has elapsed, the measurement circuitry 105 is then configured to apply signal 1 to the second transmit electrode (electrode 2) and signal 2 to the first, third and fourth electrodes (electrodes 1, 2, and 3), as shown in FIG. 5b. The signals 1 and 2 are again applied for a certain time period, e.g., T/4, and during this time, the measurement circuitry 105 makes a measurement M2 using receive electrode 102. As above, in the absence of a touch, M2 is effectively a summation of the signals from the four intersection points. The process is repeated where signal 1 is applied to electrode 3 and then electrode 4, while signal 2 is applied to the remaining electrodes, and measurements M3 and M4 are made using receive electrode, as shown in FIGS. 5c and 5d respectively.

The measurement circuitry 105 outputs measurements M1 to M4 to the processing circuitry 106. The processing circuitry 106 is configured to determine the mutual capacitance for each of the intersection points between electrodes 1 to 4 and receiver electrode 102. In particular, for the receiver electrode 102, processing circuitry 106 is configured to determine the mutual capacitances for the intersection points for electrodes 1 to 4 with receiver electrode 102 using the following equations:

$$E_{102\text{-}1} = M1\text{-}M2\text{-}M3\text{-}M4 \quad (3)$$

$$E_{102\text{-}2} = M2\text{-}M1\text{-}M3\text{-}M4 \quad (4)$$

$$E_{102\text{-}3} = M3\text{-}M1\text{-}M2\text{-}M4 \quad (5)$$

$$E_{102\text{-}4} = M4\text{-}M1\text{-}M2\text{-}M3 \quad (6)$$

where $E_{102\text{-}n}$ is the mutual capacitance for the intersection point between electrode 102 and electrode n of the drive electrodes 101.

When a drive signal is applied to a transmit electrode, as mentioned previously, an electric field is generated which couples to the receive electrode. The magnitude of the receive signal (i.e., the signal on the receive electrode) is proportional to the magnitude of the drive signal (i.e., the signal applied to the drive electrode). The magnitude of the drive signal is therefore |A|, and hence the magnitude of the receive signal can be represented by |B|. Each measurement M1 to M4 is effectively a summation of the corresponding coupled drive signal as detected by the receiving electrode. Assuming that both signal 1 and signal 2 when applied to a given transmit electrode couple to the receive electrode in the same way, then measurements M1 to M4 can be mathematically represented as:

$$M1 = +B1\sin(\omega t) + -B2\sin(\omega t) + -B3\sin(\omega t) + -B4\sin(\omega t) \quad (7)$$

$$M2 = -B1\sin(\omega t) + +B2\sin(\omega t) + -B3\sin(\omega t) + -B4\sin(\omega t) \quad (8)$$

$$M3 = -B1\sin(\omega t) + -B2\sin(\omega t) + +B3\sin(\omega t) + -B4\sin(\omega t) \quad (9)$$

$$M4 = -B1\sin(\omega t) + -B2\sin(\omega t) + -B3\sin(\omega t) + +B4\sin(\omega t) \quad (10)$$

where Bn signifies the amplitude of the coupled signal as received at the receive electrode 102 from drive electrode n.

In the absence of a touch, and assuming that the coupling between each transmit electrode and receive electrode is the same (that is, electrode 1 couples signals 1 and 2 to the receive electrode by the same amount as electrode 2 couples signals 1 and 2, etc.), then B1, B2, B3, and B4 are all equal (for convenience we shall refer to this as B), and effectively each measurement M1, M2, M3 and M4 is equal to $-2B \sin(\omega t)$. Accordingly, under these assumptions, using equations (3) to (6), the signal indicative of the mutual capacitance at each of the intersection points $E_{102-1}$, $E_{102-2}$, $E_{102-3}$, and $E_{102-4}$, is equal to $4B \sin(\omega t)$. This is a value indicative of the mutual capacitance at the intersection point between the receive electrode 102 and each of the transmit electrodes 1 to 4, and in the absence of any touch, may be referred to as indicative of the steady state of the mutual capacitance at the respective intersection point.

When a touch is present on the electrodes, say at the intersection point between electrode 1 and the receive electrode 102, then the coupling of the drive signal 1 or 2 to the receive electrode is changed (and in particular lowered). In other words, B1 is no longer equal to B. Using equations (3) to (6), and assuming that B2, B3, and B4 are all equal to B in equations (7) to (10), then the values for the intersection points read as:

$$E_{102-1} = 4B1\sin(\omega t) \quad (11)$$

$$E_{102-2} = 4B\sin(\omega t) \quad (12)$$

$$E_{102-3} = 4B\sin(\omega t) \quad (13)$$

$$E_{102-4} = 4B\sin(\omega t) \quad (14)$$

Hence, according to the present disclosure, the processing circuitry 106 is configured to combine the measurements M1 to M4 to arrive at measurements indicative of the mutual capacitances at each of the intersection points. However, what is significant here is that, although each measurement M1 to M4 takes a time period of T/4 to make the measurement, data regarding the mutual capacitance of each intersection point for a given receive electrode is obtained in each of the measurements M1 to M4. What this means is that data regarding the mutual capacitance at a given intersection point is actually obtained over the time period T (i.e., four times T/4 corresponding to the four measurements M1 to M4). Thus, effectively the number of samples for a particular intersection point is increased by four in this example as compared to the conventional approach where each intersection point is measured for a time T/4. As mentioned, the signal to noise ratio is dependent upon the square root of the number of samples (or the duration over which the measurements are sampled), and thus the processing circuitry 106 of the described implementation is able to provide a roughly double signal to noise ratio for a given signal as compared to the conventional mutual capacitance techniques described in FIG. 3.

As mentioned in relation to FIG. 3, a balance must be struck between sensitivity and responsiveness to a touch. For a four by four grid using the mutual capacitance technique as described in FIG. 3, the total scan time (and thus responsiveness) is 4T, while the sample time for each intersection point is T/4. However, for a four by four grid of electrodes using the technique described in relation to FIG. 5, the total scan time is also 4T (assuming a total time of T is required for each receive electrode 102) but the sample time for each intersection point is increased to T because each measurement M1 to M4 contributes to T/4 worth of samples of the signal at the intersection point. Thus, assuming a constant sample rate, the sensitivity of the touch sensitive apparatus 1 can be improved in accordance with the techniques of FIG. 5 while maintaining the responsiveness. Alternatively, in accordance with the techniques of FIG. 5, the time for each measurement M1 to M4 can be shortened to T/16, thus meaning that each intersection point is sampled over an equivalent period of T/4 (which provides a similar signal to noise ratio, and thus sensitivity, as in the conventional example of FIG. 3 because the number of samples for each intersection point is similar in both methods). However, the total time required to scan four receive electrodes is four times the time required to scan an individual receive electrode, which in the present case is four times T/4 which is T. Thus, the responsiveness of the touch sensitive apparatus 1 can be improved while maintaining a similar sensitivity. It should be appreciated that both sensitivity and responsiveness may be improved by setting the value for each measurement M1 to M4 between T/4 and T/16.

Hence, by comparing the derived measurement of the mutual capacitance at each intersection point to a threshold value, it can be determined by the processing circuitry 106 at which intersection points on the touch sensitive element a touch 109 is present. For example, the processing circuitry 106 in the present example is configured to determine a change in mutual capacitance by calculating the difference between the measured value of the mutual capacitance at an intersection point and a baseline value of the mutual capacitance for the intersection point in the absence of a touch obtained in advance. That is, the processing circuitry may subtract the value of $E_{102-1}$ obtained in equation (11) (or an average thereof) from the value of $E_{102-1}$ obtained in the absence of a touch (or an average thereof) and compare the difference to a predefined threshold. If the difference is greater than the predefined threshold, then the processing circuitry 106 may output a signal indicating the presence of a touch on the touch sensitive element. The output signal may either be an indication that a touch is detected, or it may include the location (e.g., X-Y coordinates) of the detected touch on the touch sensitive element. In some instances, the signal may include multiple locations corresponding to multiple detected touches.

Figure 6:
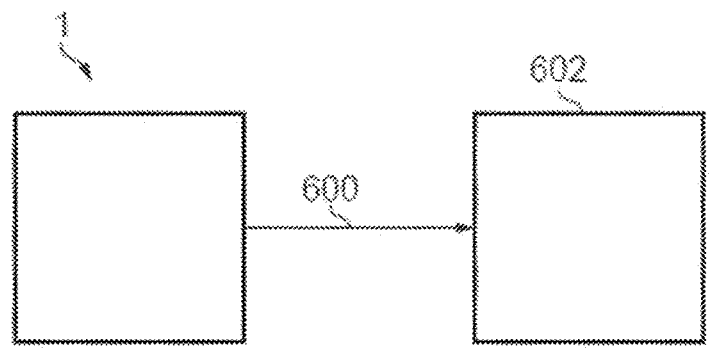
FIG. 6 schematically illustrates an example system which employs the touch sensitive apparatus of FIG. 1 in accordance with certain embodiments of the invention.

FIG. 6 is a highly schematic diagram showing the touch sensitive apparatus 1 coupled to an associated apparatus 602. The associated apparatus 602 generally comprises a computer processor which is capable of running a software application, and may also comprise a display element, such as an LCD screen or the like. In some implementations, the touch sensitive apparatus 1 is integrally formed with the associated apparatus 602, whereas in other implementations the touch sensitive apparatus 1 is able to be coupled to the associated apparatus 602 e.g., via electrical cabling. As described above, in some instances the substrate 103 and cover 108 of the touch sensitive apparatus 1 are transparent and a display element is placed behind the substrate 103 and cover 108, such as in a smartphone.

The touch sensitive apparatus 1 functions as an input mechanism for the associated apparatus 602. As mentioned, the processing circuitry 106 outputs a signal 600 indicating the presence of a touch on the touch-sensitive element to the processing circuitry of the associated apparatus (not shown). In some applications, signal 600 may simply indicate whether or not a genuine touch has been detected on the touch-sensitive element, whereas in other instances, the signal 600 may indicate one or more positions of the touch or touches on the touch-sensitive element, for example as X, Y coordinates (corresponding to the intersection points). The processing circuitry of the associated apparatus 602 may process the signal 600 in accordance with the application being run on the associated apparatus, e.g., by causing the associated apparatus to perform an action or change the image(s) that is displayed on the display unit.

While the technique described above in relation to FIG. 5 has been described with respect to four drive electrodes 101, electrodes 1 to 4, the technique can be applied to any group of transmit electrodes comprising an even number of transmit electrodes, e.g., 2, 6, etc. Suitable algorithms for applying the drive signals and processing the received measurements can be adopted depending on the number of electrodes within the group of electrodes.

For example, taking the case of two transmit electrodes, electrodes 1 and 2, and a single receive electrode 102, the measurement circuitry 105 is configured to apply signal 1 to electrode 1 and signal 2 to electrode 2 for a first time period, say T/4, and signal 1 to both electrode 1 and electrode 2 for a second time period, say T/4. The mutual capacitance for each of the intersection points between electrodes 1 to 2 and receiver electrode 102 then take the following form:

$$E_{102\text{-}1} = M1 + M2 \quad (15)$$

$$E_{102\text{-}2} = M1 - M2 \quad (16)$$

where $E_{102\text{-}n}$ is the mutual capacitance for the intersection point between electrode 102 and electrode n of the group of drive electrodes 101. In this example, the measurements M1 and M2 can be represented as:

$$M1 = +B1\sin(\omega t) + -B2\sin(\omega t) \quad (17)$$

$$M2 = +B1\sin(\omega t) + +B2\sin(\omega t) \quad (18)$$

Accordingly, in the absence of a touch, and assuming B1=B2=B, the values for $E_{102\text{-}1}$ and $E_{102\text{-}2}$ are equal to 2B sin($\omega$t).

In the event of a touch (again, for example at the intersection point between transmit electrode 1 and receiver electrode 102), then the values for the signals indicative of the mutual capacitances at the intersection points take the values as follows:

$$E_{102\text{-}1} = 2B1\sin(\omega t) \quad (19)$$

$$E_{102\text{-}2} = 2B\sin(\omega t) \quad (20)$$

where B2 is equal to B and B1 is different from B.

Similar principles as described above with respect to determining the presence of a touch on the touch sensitive element can be employed in the case of two transmit electrodes.

Therefore, in this scenario where drive signals are applied to two electrodes (e.g., electrode 1 and electrode 2), several aspects should be appreciated. Firstly, assuming each measurement M1 and M2 is performed over a time period of T/4, then to scan an entire electrode array comprising N drive electrodes 101 and M receive electrodes 102 is equal to T/4*N*M. Additionally, the magnitude of the baseline signal (i.e. in the absence of any touch) representing the mutual capacitance for any intersection point on the electrode array is equal to 2B (in practical scenarios there may well be some slight variance from this depending on the actual capacitive coupling at each of the electrode intersections, but for the purposes of the present discussion we will assume such effects can be ignored).

As described previously, the signal to noise ratio (SNR) which is effectively a metric indicating the performance of the touch sensitive apparatus can be affected both by the signal amplitude (e.g., 2B) and by the number of samples obtained (which, as discussed above, is proportional to the time period over which samples relating to that electrode is obtained, in this case T/2 as data for electrode 1 for example is obtained over the first time period T/4 and the second time period T/4). The signal to noise ratio effectively determines the sensitivity of the touch sensitive apparatus where a higher signal to noise ratio provides the ability to increase the sensitivity to a touch. Additionally, the responsiveness to a touch, as described above, is based on the total scan time required to scan all electrodes of the electrode array.

Thus, what has been described above is a way of improving the sensitivity and/or responsiveness of a touch sensitive apparatus operating using mutual capacitance sensing techniques to sense the mutual capacitance at a plurality of intersection points of a touch sensitive array formed of electrodes by increasing the signal to noise ratio and/or decreasing the total scan time. However, the inventors have developed techniques to further improve the sensitivity and/or responsiveness of a touch sensitive apparatus operating using mutual capacitance sensing techniques.

In accordance with the present disclosure, the inventors have found that by applying a drive signal (such as signal 1 and/or signal 2 described above) to pairs of neighbouring drive electrodes instead of single drive electrodes further improvements to the sensitivity and/or responsiveness of the touch sensitive apparatus can be realised.

For the avoidance of doubt, the following technique(s) that will be described are able to be applied to the touch sensitive apparatus 1 described above, e.g., in respect of FIGS. 1, 2 and 6. A detailed description of the touch sensitive apparatus 1 will not be repeated herein for conciseness, and only differences with respect to the aforementioned touch sensitive apparatus 1 will be described. However, in broad summary, in accordance with the following techniques, the measurement circuitry 105 is configured to apply drive signals to pairs of neighbouring drive electrodes 101 of the electrode array at any one time. That is, for example, the measurement circuitry 105 is able to provide a first signal to a first pair of neighbouring drive electrodes and a second signal to a second pair of neighbouring drive electrodes. The precise way in which the measurement circuitry 105 is configured to perform this is not of significance to the present disclosure (for example, the measurement circuitry could be configured to use one or more multiplexers or to have dedicate drive signal generators for each drive electrode).

To help explain the principles of this technique, we refer to FIG. 7 which shows a plurality of drive electrodes 101 and a single receive electrode 102 in a variety of scenarios, in a similar manner to FIG. 5 described previously. Unlike FIG. 5, however, FIG. 7 shows six drive electrodes labelled 1 to 6 respectively.

Broadly speaking, in accordance with the present disclosure, the drive signals used for driving the drive electrodes (such as signals 1 and 2 described previously) are applied to pairs of neighbouring drive electrodes. In this regard, "neighbouring" is understood to mean a drive electrode that is directly adjacent to a given drive electrode in the electrode array. For example, and with reference to FIG. 7a, drive electrodes 3 and 5 are directly adjacent (or neighbour) drive electrode 4. Thus, for a first period of time a first one of either the first drive signal (signal 1) or the second drive signal (signal 2) is applied to a first pair of drive electrodes, and a second one of either the first drive signal or the second drive signal is applied to a second pair of drive electrodes. For a second period of time, a first one of either the first drive signal (signal 1) or the second drive signal (signal 2) is applied to the first pair of drive electrodes, and a second one of either the first drive signal or the second drive signal is applied to the second pair of drive electrodes. For at least one pair of electrodes, the drive signal applied to the pair of electrodes during the first time period is different to the drive signal applied to the pair of electrodes during the second time period. Once the measurements have been obtained, processing circuitry 106 may combine the measurements to derive indications of the mutual capacitance associated with the first pair of drive electrodes and the receive electrode and/or of the mutual capacitance associated with the second pair of drive electrodes and the receive electrode.

Figure 7A:
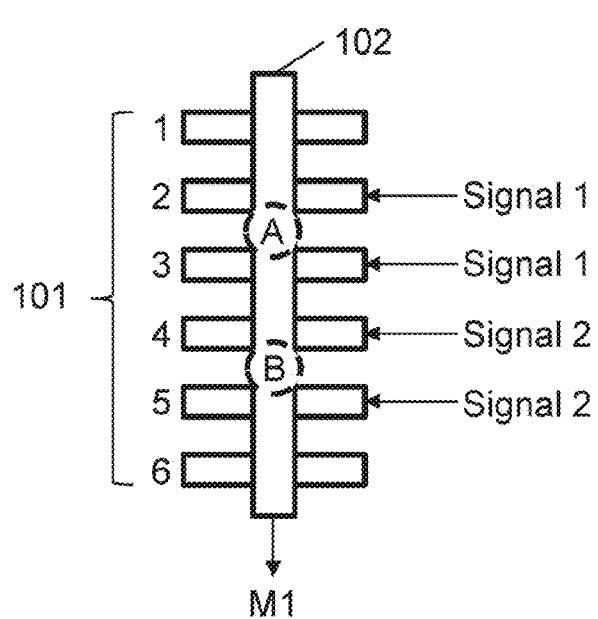
FIGS. 7a to 7d schematically illustrates a part of an electrode array of a touch sensitive apparatus for explaining example aspects of measurement techniques in accordance with certain embodiments of the invention where pairs of drive electrodes are driven with a common drive signal.

FIG. 7a shows a first scenario in accordance with the present disclosure. As can be seen, a first drive signal (signal 1) is applied to the drive/transmit electrodes 2 and 3, while a second drive signal (signal 2) is applied to the drive/transmit electrodes 4 and 5 (or conversely the second drive signal (signal 2) could be applied to the drive/transmit electrodes 2 and 3, and the first drive signal (signal 1) could be applied to the drive/transmit electrodes 4 and 5). The drive signals may be generated using the drive circuitry 112 as described with respect to FIG. 4, and applied to the respective pair of electrodes using suitable circuitry as described previously (e.g., one or more multiplexers, and/or dedicated drive circuitry for an electrode). In a similar manner, the drive signals 1 and 2 are applied to the respective drive electrodes for a first time period and, during this time period, the measurement circuitry 105 is configured to obtain a measurement M1 from the receive electrode 102. For the purposes of comparison, we will say that the first time period is equal to T/4.

Figure 7B:
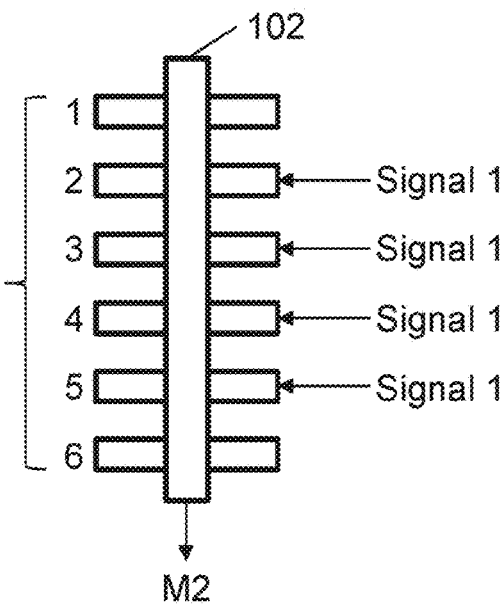

FIG. 7b shows a second scenario, later in time, in which the drive electrodes 2, 3, 4, and 5 are now all driven with drive signal 1 (or conversely, they could all instead be driven by drive signal 2). As before, the drive electrodes 2, 3, 4, and 5 are driven with drive signal 1 for a second time period (which may be equal to the first time period) and during this time period the measurement circuitry 105 is configured to obtain a measurement M2 from the receive electrode 102.

In both scenarios represented by FIGS. 7a and 7b, the drive electrodes that are not being driven by either of signals 1 or 2 (i.e., drive electrodes 1 and 6) are coupled to ground or otherwise connected in such a way as to not influence the measurements M1 and M2.

One difference that is notable with respect to the example of FIG. 5 is that, in FIG. 7, the mutual capacitance of the intersection point (i.e., where a transmit electrode 101 physically crosses/intersects with a receive electrode 102) is not sensed directly. Rather, because of the spatial distribution of the drive electrodes and the fact that pairs of neighbouring electrodes are driven by the same drive signal, what is sensed is effectively a position that is midway between the two drive electrodes forming the pair (e.g., represented by a dashed circle labelled A in FIG. 7a for the drive electrodes 2 and 3 and by a dashed circle labelled B in FIG. 7a for the drive electrodes 4 and 5). These offset positions shown by A and B in FIG. 7a will be referred to herein as "offset" intersection points. In respect of FIG. 5, true intersection points were denoted as $E_{102-n}$ where n is the labelled drive electrode (e.g., 1 to 4) that intersects the respective receive electrode 102. To distinguish from these true intersection points, a different numbering will be used as follows: $E_{102-n-n+1}$.

For example, the offset intersection point denoted by A in FIG. 7a is denoted by $E_{102-2-3}$ under the different numbering and this numbering $E_{102-2-3}$ refers to the offset intersection point between drive electrodes 2 and 3 with respect to receive electrode 102.

Hence, taking the example of FIGS. 7a and 7b, and as described previously, the measurements M1 and M2 can be represented as:

$$M1 = +B2\sin(\omega t) + +B3\sin(\omega t) + -B4\sin(\omega t) + -B5\sin(\omega t) \quad (21)$$

$$M2 = +B2\sin(\omega t) + +B3\sin(\omega t) + +B4\sin(\omega t) + +B5\sin(\omega t) \quad (22)$$

where, as previously, the term Bn signifies the amplitude of the coupled signal as received at the receive electrode 102 from drive electrode n. The equations (21) and (22) are similar in principle to equations (17) and (18) above, except in this instance there is a component from both electrode 2 and 3 (the first two terms of the right-hand side of equations (21) and (22)) and a component from both electrode 4 and 5 (the last two terms of the right-hand side of equations (21) and (22)).

To find the mutual capacitance for each of the offset intersection points A and B (or $E_{102-2-3}$ and $E_{102-4-5}$), we can use the equations:

$$E_{102-2-3} = M1 + M2 \quad (23)$$

$$E_{102-4-5} = M1 - M2 \quad (24)$$

For example, taking the offset intersection point $E_{102-2-3}$, and inserting equations (21) and (22) into equation (23), equation (23) becomes:

$$E_{102\text{-}2\text{-}3} = B2\sin(\omega t) + B3\sin(\omega t) - B4\sin(\omega t) - B5\sin(\omega t) + +B2\sin(\omega t) +$$
$$B3\sin(\omega t) + B4\sin(\omega t) + B5\sin(\omega t) = 2B2\sin(\omega t) + 2B3\sin(\omega t)$$

As seen from the above, $E_{102\text{-}2\text{-}3}$ is effectively a combination of the signals from both electrode 2 and electrode 3 over the first and second time periods.

Assuming that no object/touch is present, then we may assume that the amplitudes B2 and B3 are approximately the same. Thus, the baseline signal magnitude for $E_{102\text{-}2\text{-}3}$ (and by analogy, for any offset intersection point) is around 4B. As should be understood, as compared to the signal $E_{102\text{-}1}$ (equation 15), the signal magnitude obtained when driving pairs of electrodes with the same signal is approximately double that compared to driving individual electrodes (i.e., 4B to 2B).

Assuming each measurement M1 and M2 is obtained over the time period T/4, the total time period required to obtain both measurements M1 and M2 is T/2. This is the same both when driving single electrodes with drive signals and when driving pairs of electrodes with a drive signal. Therefore, simply by driving pairs of electrodes, as opposed to single electrodes, with a drive signal, one can increase the signal to noise ratio by a factor of two. Accordingly, and as discussed previously, the sensitivity to a touch can be improved (due to the increased signal magnitude) and/or the responsiveness to a touch can be improved (by reducing T while still maintaining the same SNR) as compared to the scenario where the drive signals 1 and 2 are applied to one of two electrodes for a first time period and a second time period.

FIGS. 7a and 7b show that for four drive electrodes (2 to 5), measurements indicative of the mutual capacitance for only two offset intersection points (A and B) are able to be obtained. This is in contrast, for example, to the example shown in FIG. 5 where for driving four drive electrodes, measurements indicative of the mutual capacitance for four intersection points are able to be obtained ($E_{102\text{-}1}$ to $E_{102\text{-}4}$). In essence, by driving pairs of electrodes together with the same drive signal, the spatial resolution in the Y-direction may decrease.

Accordingly, to overcome this decrease in the spatial resolution in the Y-direction, the inventors have realised that by shifting the pairs of adjacent electrodes in the direction of the extent of the receive electrode (i.e., the Y-direction) by one electrode, additional measurements of the mutual capacitance of offset intersection points may be made that compensate for the spatial resolution while not adversely affecting the responsiveness of the touch sensitive apparatus.

Figure 7C:
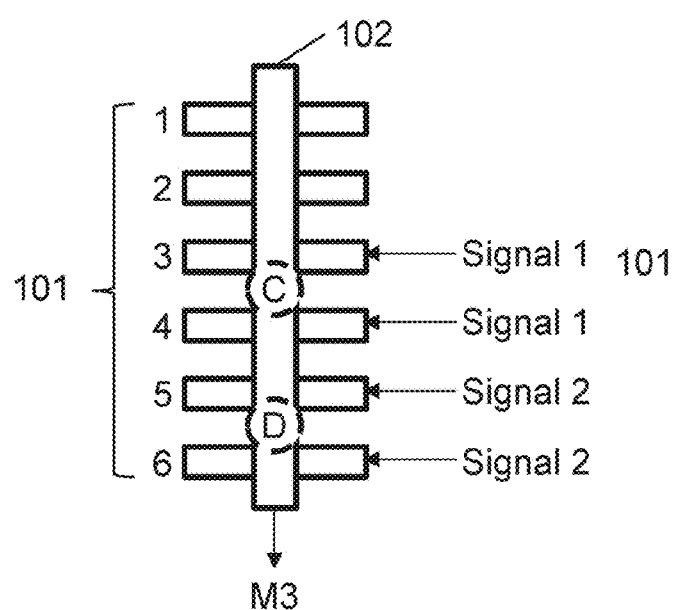

FIG. 7c shows a third scenario that follows from FIG. 7b. In this scenario, the first drive signal (signal 1) is applied to transmit electrodes 3 and 4, while the second drive signal (signal 2) is applied to transmit electrodes 5 and 6. These electrodes are driven by their respective signals for a third time period (which may be equal to the first and second time periods) during which time the measurement circuitry 105 is configured to obtain a third measurement M3 from the receive electrode 102. FIG. 7c describes, in effect, the same scenario as shown in FIG. 7a with the four drive electrodes (or two pairs of drive electrodes) shifted in the Y-direction by one electrode. More specifically, the adjacent pairs of electrodes (electrodes 2 and 3, and 4 and 5) are shifted by one such that a third pair of electrodes (electrodes 3 and 4) and a fourth pair of electrodes (electrodes 5 and 6) are able to be driven with the drive signals in a similar manner as described by FIGS. 7a and 7b. The third pair of adjacent electrodes comprises one of the first pair of electrodes (e.g., electrode 3) and the fourth pair of adjacent electrodes comprises one of the second pair of electrodes (e.g., electrode 5). Moreover, in this specific example, the third pair of electrodes is formed from one electrode from the first electrode pair and one electrode from the second electrode pair.

Therefore, it should be appreciated that FIG. 7c shows two offset interaction points indicated by the letter C in a dashed circle (between drive electrodes 3 and 4), and the letter D in a dashed circle (between the drive electrodes 5 and 6), indicating the positions of the offset intersection points that are able to be measured (i.e., an indication of the mutual capacitances obtained) for the scenario in FIG. 7c. As should be appreciated, these offset intersection points are positioned effectively in between the offset intersection points A and B shown in FIG. 7a.

Figure 7D:
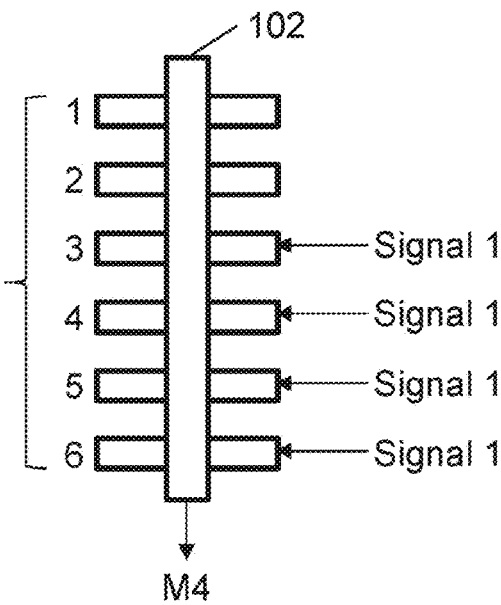

FIG. 7d shows a fourth scenario. In this scenario, the first drive signal (signal 1) is applied to transmit electrodes 3, 4, 5, and 6 (although as discussed previously, signal 2 could alternatively be applied to all four electrodes). These electrodes are driven by the first drive signal for a fourth time period (which may be equal to the first to third time periods) during which time the measurement circuitry 105 is configured to obtain a fourth measurement M4 from the receive electrode 102. It should be appreciated that FIG. 7d is analogous to FIG. 7b with the pairs of drive electrodes shifted by one electrode in the Y-direction.

In a similar manner to FIGS. 7a and 7b, the same techniques can be applied to obtain indications of the mutual capacitances of the offset intersection points C ($E_{102\text{-}3\text{-}4}$) and D ($E_{102\text{-}5\text{-}6}$) using measurements M3 and M4. More specifically, the measurements M3 and M4 can be represented as:

$$M3 = +B3\sin(\omega t) + +B4\sin(\omega t) + -B5\sin(\omega t) + -B6\sin(\omega t) \quad (25)$$

$$M4 = +B3\sin(\omega t) + +B4\sin(\omega t) + +B5\sin(\omega t) + +B6\sin(\omega t) \quad (26)$$

where, as previously, the term Bn signifies the amplitude of the coupled signal as received at the receive electrode 102 from drive electrode n.

To find the mutual capacitance for each of the offset intersection points C and D (or $E_{102\text{-}3\text{-}4}$ and $E_{102\text{-}5\text{-}6}$), we can use the equations:

$$E_{102\text{-}3\text{-}4} = M3 + M4 \quad (27)$$
$$E_{102\text{-}5\text{-}6} = M3 - M4 \quad (28)$$

Hence, by obtaining the measurements M1 to M4, and by shifting the pairs of electrodes in the Y-direction by an electrode, information regarding the mutual capacitances for four offset intersection points (A to D) can be obtained. By ensuring that the measurements M3 and M4 are performed on a set of transmit electrodes that are shifted in the Y-direction (or more generally, the direction in which the receive electrode 102 extends) by one electrode (or an odd multiple of an electrode), the spatial resolution in the Y-direction can be preserved, such that the relative spacing between the offset intersection points in the Y-direction is broadly similar to the drive electrode spacing/pitch in the Y-direction. Therefore, by effectively overlapping the pairs of drive electrodes that are used to obtain the different measurements M1 to M4, the spatial resolution is preserved at substantially the previous level.

It should further be appreciated that as each measurement M1 to M4 is obtained over the time period T/4, the total time required to obtain the measurements M1 to M4 (and thus obtain information regarding the mutual capacitance at the four offset intersection points) is T and is the same time required to obtain information regarding the mutual capacitances at four locations using the technique of driving two electrodes (e.g., apply signal 1 to electrode 1 and signal 2 to electrode 2 for a first time period, T/4, signal 1 to both electrode 1 and electrode 2 for a second time period, T/4, apply signal 1 to electrode 3 and signal 2 to electrode 4 for a third time period, T/4, and signal 1 to both electrode 3 and electrode 4 for a fourth time period—see equations 15 to 20). However, as mentioned previously, although the total time period is the same, the signal strength/magnitude theoretically achievable for each offset intersection point is increased.

Accordingly, by applying the above technique of driving pairs of electrodes with the same drive signal, the sensitivity of the touch sensitive apparatus can be improved by increasing the SNR while maintaining the responsiveness of the touch sensitive apparatus at a similar level and/or the responsiveness can be improved by decreasing T while achieving a similar signal to noise ratio (or any balance between sensitivity and/or responsiveness can be realised, as described previously).

Figure 8:
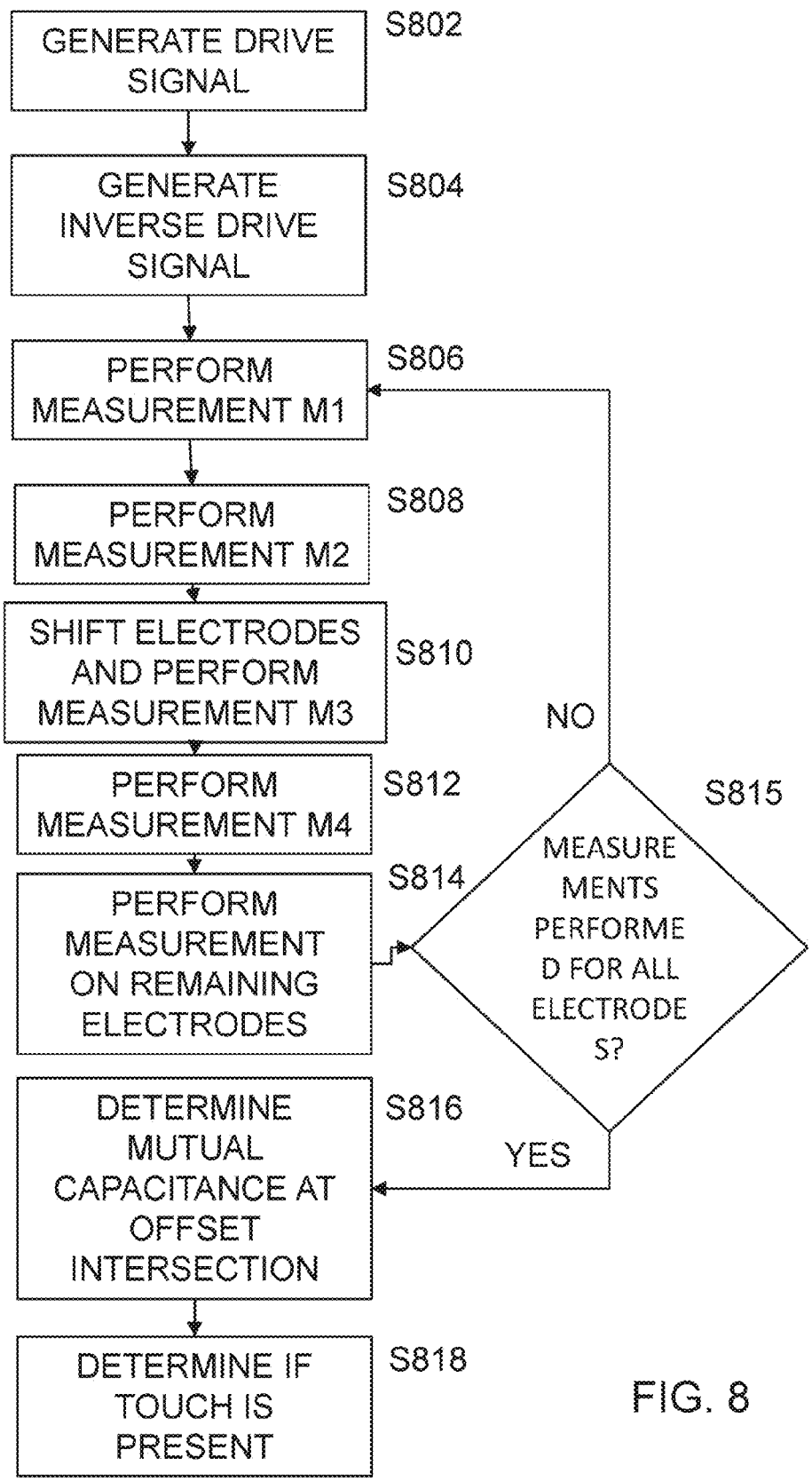
FIG. 8 shows a method for detecting a touch using a touch sensitive apparatus in accordance with certain embodiments of the invention.

FIG. 8 describes an exemplary method for determining the presence of a touch on a touch sensitive element of a touch sensitive apparatus 1 in accordance with the principles of the present disclosure.

The method begins at step S802 where drive circuitry 112 generates the drive signal (i.e., signal 1). At step S804, the drive circuitry 112 generates the inverse drive signal (i.e., signal 2). Step S804 may utilise the drive signal generated at step S802 as described previously.

At step S806, the method performs measurement M1 on a receive electrode that intersects at least four drive electrodes (two pairs of drive electrodes). This measurement M1 is performed for a first time period. As described previously, at step S806 the measurement circuitry 105 applies at least one of signal 1 and signal 2 to a first pair of adjacent drive electrodes and a second pair of adjacent drive electrodes. For example, and as described above, the measurement circuitry 105 applies signal 1 to the first pair of drive electrodes (electrodes 2 and 3 of FIG. 7a) and applies signal 2 to the second pair of drive electrodes (electrodes 4 and 5 of FIG. 7a). Signal 1 couples to the receive electrode 102 from the first pair of electrodes and signal 2 couples to the receive electrode 102 from the second pair of electrodes, and measurement circuitry 105 performs measurement M1. The method proceeds then to step S808.

At step S808, the method performs measurement M2 on the same receive electrode. This measurement M2 is performed for a second time period, which in this implementation is of the same duration as the first time period. As described previously, at step S808 the measurement circuitry 105 applies at least one of signal 1 and signal 2 to the first pair of drive electrodes and at least one of signal 1 and signal 2 to the second pair of drive electrodes, where the signal applied to at least one of the first or second pair of drive electrodes in the first time period is different to the signal applied to the at least one of the first or second pairs of drive signals in the second time period. For example, and as described above, the measurement circuitry 105 applies signal 1 to the first pair of drive electrodes and to the second pair of drive electrodes. Signal 1 couples to the receive electrode 102 from the respective pairs of drive electrodes, and measurement circuitry 105 performs measurement M2.

The method then proceeds to step S810. At step S810, the method performs measurement M3 on the same receive electrode, however the drive electrodes to which the drive signals 1 and 2 are applied are now shifted by one electrode. In other words, the measurement circuitry is configured to apply at least one of signal 1 and signal 2 to a third pair of electrodes where the third pair of electrodes includes at least one electrode of the first pair of electrodes, and to apply at least one of signal 1 and signal 2 to a fourth pair of electrodes where the fourth pair of electrodes includes at least one electrode of the second pair of electrodes. Additionally, one drive electrode of the third pair of drive electrodes neighbours one electrode of the fourth pair of electrodes.

More specifically, as shown in FIG. 7c, the measurement circuitry 105 applies signal 1 to drive electrodes 3 and 4 as the third pair of electrodes, and signal 2 to drive electrodes 5 and 6 as the fourth pair of electrodes. As before, this measurement M3 is performed for a third time period, which in this implementation is of the same duration as the first time period. Signal 1 couples to the receive electrode 102 from the third pair of electrodes and signal 2 couples to the receive electrode 102 from the fourth pair of electrodes, and measurement circuitry 105 performs measurement M3. The method proceeds then to step S812.

At step S812, the method performs measurement M4 on the same receive electrode. This measurement M4 is performed for a fourth time period, which in this implementation is of the same duration as the first time period. As described previously, at step S810 the measurement circuitry 105 applies at least one of signal 1 and signal 2 to the third pair of drive electrodes and at least one of signal 1 and signal 2 to the fourth pair of drive electrodes, wherein the signal applied to at least one of the third or fourth pair of drive electrodes in the third time period is different to the signal applied to the at least one of the third or fourth pairs of drive signals in the fourth time period. For example, and as described above, the measurement circuitry 105 applies signal 1 to the third pair of drive electrodes and to the fourth pair of drive electrodes. Signal 1 couples to the receive electrode 102 from the respective pairs of drive electrodes, and measurement circuitry 105 performs measurement M4.

It should be appreciated that steps S806 to S812 represent the four scenarios depicted by FIGS. 7a to 7d respectively. Although FIG. 8 shows method steps S806 to S812 being performed in the order described and shown, in principle, the method steps could be performed in any order, provided the steps S806 to S812 allow for the measurements M1 to M4 to be performed.

Once steps S806 to S812 have been performed, and the relevant measurements M1 to M4 have been obtained, the measurement circuitry 105 is configured to perform measurements for the remaining drive electrodes 101 forming the electrode array at step S814, assuming the electrode array has greater than five drive electrodes.

More specifically, and with reference to FIG. 7a, the measurement circuitry 105 is configured to repeat steps S806 to S812 but with a new set of pairs of drive electrodes for the electrode array. For instance (and although not all the drive electrodes are shown on FIG. 7a), the measurement circuitry may now apply signals to drive electrode 6 and (not shown) drive electrode 7 acting as the first pair of electrodes in step S806 and apply signals to (not shown) drive electrodes 8 and 9 acting as the second pair of electrodes in step S806. The measurement circuitry 105 attempts to select a group of four adjacent electrodes that are different from the four electrodes forming the first pair of drive electrodes and the second pair of drive electrodes to act as a new first pair of electrodes and a new second pair of electrodes. The steps S806 to S812 are repeated for the new first and second pairs of electrodes to obtain measurements M5 to M8. The process is then repeated until all drive electrodes have been selected/driven and measurements have been obtained (S815).

The method proceeds then to step S816 where the processing circuitry 106, using the obtained measurements, determines a value or signal indicative of the mutual capacitance at each of the offset intersection points with respect to the receive electrode. As described above, the processing circuitry may use equations (23) to (24) or (27) and (28), or variations thereof, depending on the pairs of drive electrodes used.

At step S818, the method then proceeds to determine whether a touch is detected at any of the offset intersection points. As described previously, this may involve determining a change in the signal indicative of the mutual capacitance of the offset intersection point by comparing the signal obtained at step S816 with a value for the offset intersection point obtained in the absence of a touch. This may be obtained in advance or in a calibration process e.g., during manufacture of the touch sensitive apparatus. If the difference/change exceeds a predetermined amount, then the processing circuitry 106 determines that a touch is present at the offset intersection point.

Although FIG. 8 shows the method ending here, it should be appreciated that steps S806 to S818 may be repeated for each of the receive electrodes forming the electrode array. Indeed, what has been described above relates to obtaining measurements for the different drive electrodes intersecting with one receive electrode, and the method may be repeated for each receive electrode that forms the electrode array.

It should also be appreciated that although step S818 is performed after each of the measurements is obtained through steps S806 to S815, it should be appreciated that step S816 and/or step S818 may be performed at any point after a partial or complete scan of the electrode array. For example, step S818 may not be performed until a value indicative of the mutual capacitance at each of the offset intersection points of the electrode array has been obtained. Conversely, step S818 may be performed after values indicative of the mutual capacitance at pairs of offset intersection points are obtained.

In addition, although FIG. 8 shows the method ending at step S818, it should be appreciated that steps S806 to S818 may be repeated cyclically during operation of the touch sensitive apparatus 1. That is, the steps may be repeated for each scan of the electrode array (that is, for each drive electrode and each receive electrode forming the electrode array) and each scan may be performed periodically.

It should be appreciated that in accordance with the present technique described, e.g., with respect to FIG. 7, the number of offset intersection points for a given number of drive electrodes is less that the number of actual intersection points. For example, taking FIG. 7a, although there are six drive electrodes 1 to 6, which equates to six physical intersection points, only five offset intersection points are present (A and B shown in FIG. 7a, C and D shown in FIG. 7c, and the offset intersection point between electrodes 1 and 2). This is because effectively the offset intersection point is offset from the physical location of the intersection of a given drive electrode and receive electrode 102 and, because it is shifted in the direction of the paired electrode (i.e., the other drive electrode that is driven at the same time as the given electrode), at the drive electrodes that define the edge of the electrode array of the touch sensitive apparatus, the offset intersection point is only ever able to be offset "inside" the drive electrodes at the edge of the touch sensitive apparatus. In effect, this means that the relative size of the sensing area defined by the electrode array is decreased by about one separation distance between drive electrodes (i.e., the distance between drive electrodes in the Y-direction) in the Y-direction. This equates to half the separation distance from the top and bottom (relative to the extent of the receive electrode) from the electrode array. It should be appreciated that the electrode array may be increased in size (e.g., an additional drive electrode added) to compensate for this.

In addition, it should be appreciated that most touch screens comprise a large number of transmit and receive electrodes defining hundreds of intersection points on a touch sensitive surface. The present technique requires five drive electrodes to obtain indications of the mutual capacitances at four offset intersection points, although all but one of the electrodes is overlapped/used again when obtaining measurements from other offset intersection points. For maximum efficiency (i.e., avoiding duplication of measurements), electrode arrays having a number of drive electrodes equal to 4N+1, where N is any positive integer, can be divided to ensure that one measurement is obtained per offset intersection point.

For electrode arrays comprising any other number of drive electrodes greater than five and not equal to 4N+1, the present techniques can still be applied but there may be some duplication of the measurements obtained for some offset intersection points. By way of example, with reference to FIG. 7a which comprises six drive electrodes and a maximum of five offset intersection points, values indicative of the mutual capacitances for the offset intersection points A to D can be obtained using the technique as shown in FIGS. 7a to 7d and obtaining measurements M1 to M4. However, to obtain a measurement of the offset intersection point between electrodes 1 and 2, the measurement circuitry 105 may have to select electrodes 1 and 2 as a first pair of drive electrodes, and electrodes 3 and 4 as a second pair of drive electrodes. In this instance, when applying the same techniques, the measurement circuitry 105 ends up with duplicate indications of the mutual capacitances for certain offset intersection points (e.g., offset intersection points A, C and B) in addition to the indication of the mutual capacitance for the offset intersection point between drive electrodes 1 and 2. Although this results in some duplication, in principle, such duplication will only be near the edges of the touch sensitive surface and in situations where there is not 4X+1 drive electrodes in the total electrode array.

Hence, in broad summary, when the total number of drive electrodes for a given receive electrode is not equal to 4N+1, where N is a positive integer number, the measurement circuitry 105 is configured to (as part of step S814 of FIG. 8) select pairs of drive electrodes where at least one of the drive electrodes of a pair of the drive electrodes is comprised in a pair of drive electrodes to which a drive signal has already been applied.

Furthermore, the above has described driving two pairs of drive electrodes at any given time, where the pairs of electrodes are driven with a common drive signal. However, the principles of the present disclosure may be applied to instances where more than two pairs of drive electrodes are driven with a common drive signal. More specifically, four, eight, sixteen, thirty-two, etc. pairs of drive electrodes may be driven, each with a common drive signal in accordance with the principles of the present disclosure.

Figure 9A:
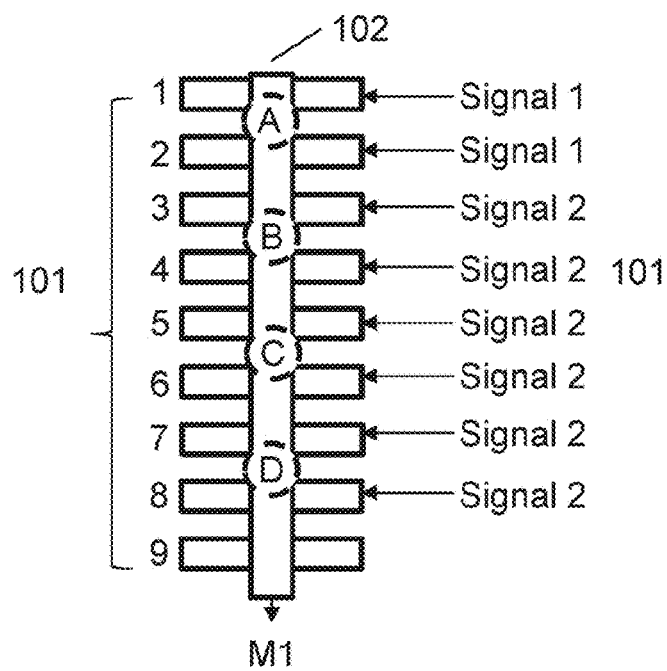
FIGS. 9a to 9h schematically illustrates a part of an electrode array of a touch sensitive apparatus for explaining example aspects of measurement techniques in accordance with certain embodiments of the invention where four pairs of neighbouring drive electrodes are driven with a common drive signal.
Figure 9B:
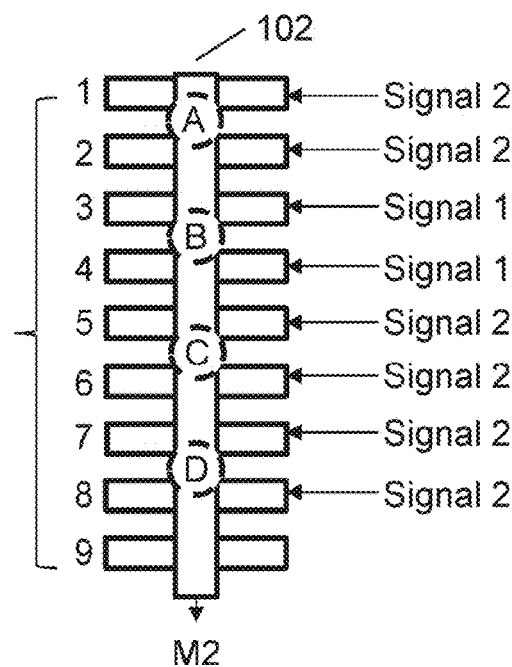
Figure 9C:
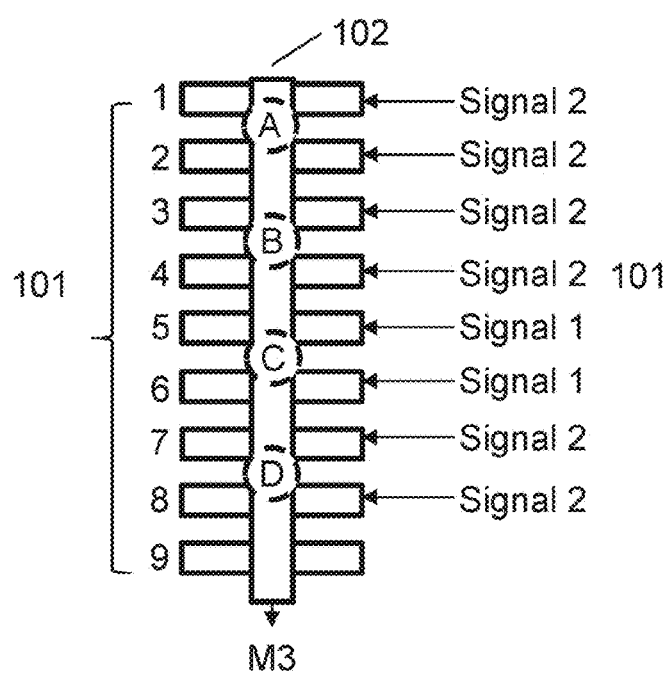
Figure 9D:
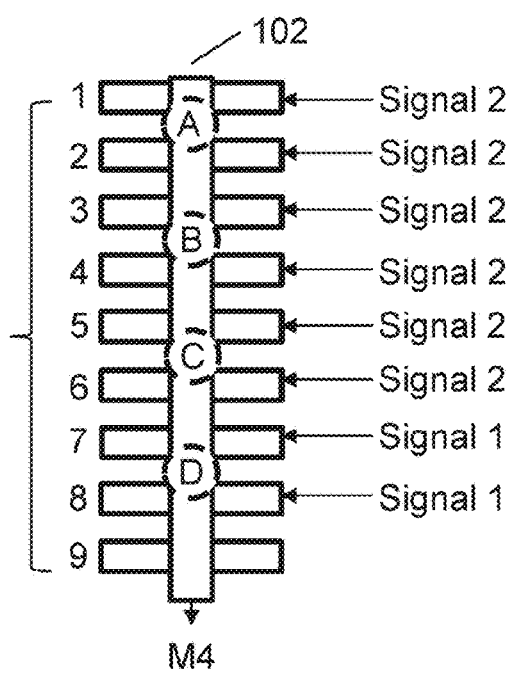
Figure 9E:
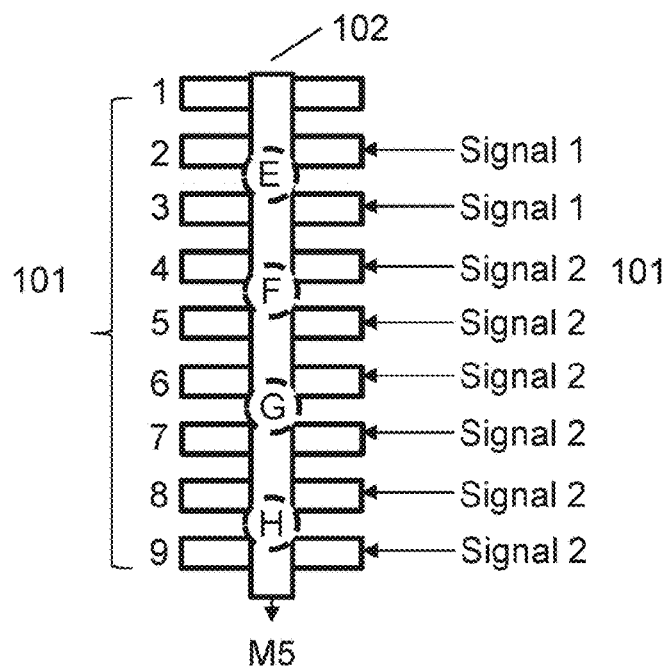
Figure 9F:
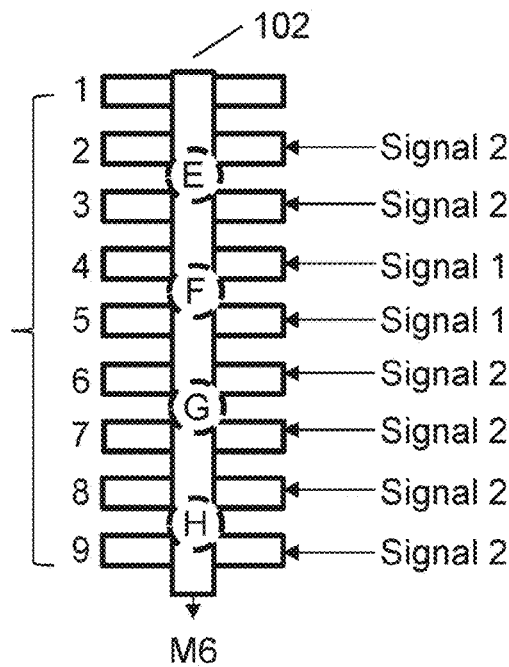
Figure 9G:
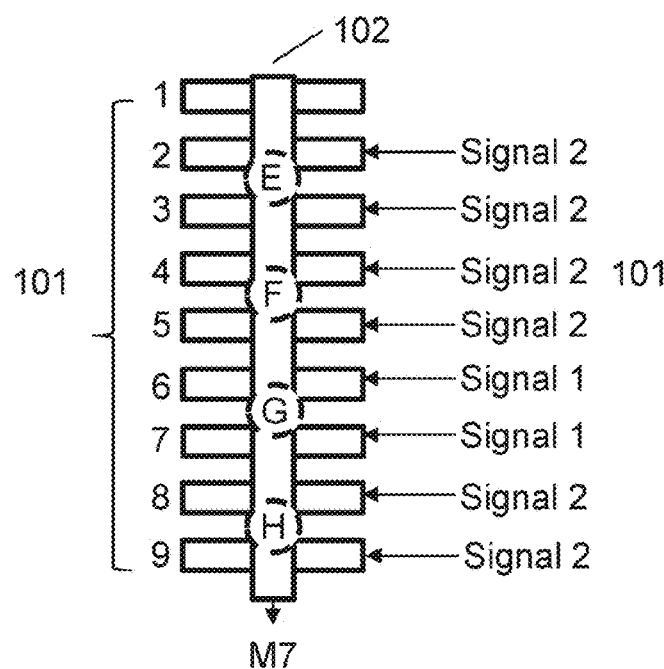

FIGS. 9a to 9h schematically show the above technique of driving pairs of electrodes with a common drive signal when driving a total of four pairs of drive electrodes (i.e., eight drive electrodes in total). As will become clear, the scenarios shown in FIGS. 9a to 9d mirror those shown in FIGS. 5a to 5d described above with the exception that pairs of electrodes (rather than single electrodes) are driven by a common drive signal. FIGS. 9e to 9g also mirror FIGS. 5a to 5d with the same exception, and further are shifted by one drive electrode in the direction of extent of the receive electrode 102. FIGS. 9a to 9g also show a total of nine electrodes, labelled 1 to 9, following the convention as before.

As shown in FIG. 9a, the measurement circuitry 105 is configured to apply signal 1 and signal 2 to a group of eight drive electrodes 101 comprising four pairs of drive electrodes 101. Initially, the measurement circuitry 105 applies signal 1 to a first pair of neighbouring drive electrodes (electrodes 1 and 2) and signal 2 to the second to fourth pairs of neighbouring drive electrodes (electrodes 3 and 4, 5 and 6, and 7 and 8), as shown in FIG. 9a. The signals 1 and 2 are applied for a certain time period, e.g., T/4, and during this time, the measurement circuitry 105 makes a measurement M1 using receive electrode 102. It should be appreciated that this scenario effectively mirrors FIG. 5a. The measurement M1 is effectively a summation of each of the signals received from each of the eight drive electrodes 1 to 8. As discussed previously, however, because pairs of electrodes are being driven by a common drive signal, there exists an offset intersection point for each of the pairs of drive electrodes (shown by points A, B, C, and D in FIG. 9a). Thus, the measurement M1 contains information indicative of the mutual capacitance at each of the offset intersection points A, B, C, and D.

After the time T/4 has elapsed, the measurement circuitry 105 is then configured to apply signal 1 to the second pair of drive electrodes (electrode 3 and 4) and signal 2 to the first, third and fourth pairs of drive electrodes (electrodes 1 and 2, 5 and 6, and 7 and 8), as shown in FIG. 9b. The signals 1 and 2 are again applied for a certain time period, e.g., T/4, and during this time, the measurement circuitry 105 makes a measurement M2 using receive electrode 102. It should be appreciated that this scenario effectively mirrors FIG. 5b. As above, in the absence of a touch, M2 is effectively a summation of the signals from the eight electrodes.

The process is repeated where signal 1 is applied to the third pair of drive electrodes (5 and 6) for a third time period and then to the fourth pair of drive electrodes (7 and 8) for a fourth time period, while signal 2 is applied to the remaining electrodes of the eight electrodes, and measurements M3 and M4 are made using receive electrode 102, as shown in FIGS. 9c and 9d respectively. It should be appreciated that this effectively mirrors the scenario shown by FIGS. 5c and 5d.

In a similar manner, the measurement circuitry 105 outputs measurements M1 to M4 to the processing circuitry 106. The processing circuitry 106 is configured to determine the mutual capacitance for each of the offset intersection points A to D between the pairs of drive electrodes and receiver electrode 102. In particular, for the receiver electrode 102, processing circuitry 106 is configured to determine the mutual capacitances for the offset intersection points using the following equations (which mirror equations 3 to 6):

$$E_{102\text{-}1\text{-}2} = M1 - M2 - M3 - M4 \quad (29)$$

$$E_{102\text{-}3\text{-}4} = M2 - M1 - M3 - M4 \quad (30)$$

$$E_{102\text{-}5\text{-}6} = M3 - M1 - M2 - M4 \quad (31)$$

$$E_{102\text{-}7\text{-}8} = M4 - M1 - M2 - M3 \quad (32)$$

where $E_{102\text{-}n\text{-}m}$ is the mutual capacitance for the offset intersection point between electrode 102 and electrodes n and m of the drive electrodes 101.

For the avoidance of doubt, assuming the magnitude of the receive signal can be represented by |B| as before, each measurement M1 to M4 is effectively a summation of the corresponding coupled drive signals as detected by the receiving electrode. Assuming that both signal 1 and signal 2 when applied to a given transmit electrode couple to the receive electrode in the same way, then measurements M1 to M4 can be mathematically represented as:

$$M1 = +B1\sin(\omega t) + +B2\sin(\omega t) + -B3\sin(\omega t) + -B4\sin(\omega t) + \quad (33)$$
$$-B5\sin(\omega t) + -B6\sin(\omega t) + -B7\sin(\omega t) + -B8\sin(\omega t)$$

$$M2 = -B1\sin(\omega t) + -B2\sin(\omega t) + +B3\sin(\omega t) + -B4\sin(\omega t) + \quad (34)$$
$$-B5\sin(\omega t) + -B6\sin(\omega t) + -B7\sin(\omega t) + -B8\sin(\omega t)$$

$$M3 = -B1\sin(\omega t) + -B2\sin(\omega t) + -B3\sin(\omega t) + \quad (35)$$
$$-B4\sin(\omega t) + +B5\sin(\omega t) + +B6\sin(\omega t) + -B7\sin(\omega t) + -B8\sin(\omega t)$$

$$M4 = -B1\sin(\omega t) + -B2\sin(\omega t) + -B3\sin(\omega t) + \quad (36)$$
$$-B4\sin(\omega t) + +B5\sin(\omega t) + -B6\sin(\omega t) + +B7\sin(\omega t) + +B8\sin(\omega t)$$

where Bn signifies the amplitude of the coupled signal as received at the receive electrode 102 from drive electrode n. Note that these equations include eight terms from each of the eight drive electrodes, but show pairs of terms following the patterns established in equations (7) to (10) discussed in relation to FIGS. 5a to 5d.

In the absence of a touch, and assuming that the coupling between each transmit electrode and receive electrode is the same (that is, electrode 1 couples signals 1 and 2 to the receive electrode by the same amount as electrode 2 couples signals 1 and 2, etc.), then B1 to B8 are all equal (for convenience we shall refer to this as B, as before), and effectively each measurement M1, M2, M3 and M4 is equal to $-4B \sin(\omega t)$. (Note that this is twice as much as compared to the scenario of FIGS. 5a to 5d). Accordingly, under these assumptions, using equations (29) to (32), the signal indicative of the mutual capacitance at each of the intersection points $E_{102\text{-}1\text{-}2}$, $E_{102\text{-}3\text{-}4}$, $E_{102\text{-}5\text{-}6}$, and $E_{102\text{-}7\text{-}8}$, is equal to $8B \sin(\omega t)$. This is a value indicative of the mutual capacitance at the offset intersection point between the receive electrode 102 and each pair of transmit electrodes, and in the absence of any touch, may be referred to as indicative of the steady state of the mutual capacitance at the respective intersection point. In a similar manner to that as described in relation to FIGS. 5a to 5d, when a touch is present at or in proximity to any of the offset intersection points, then the coupling of the drive signal 1 or 2 to the receive electrode is changed (and in particular lowered). In other words, the magnitude of the signal for a pair of electrodes may change from B, and this change can be detected relative to the steady state determined above.

Once the measurements M1 to M4 have been performed, the (four) pairs of electrodes are shifted by one drive electrode in the direction of extent of the receive electrode 102 (i.e., the Y-direction) in a similar manner as discussed in relation to FIGS. 7c and 7d. FIGS. 9e to 9h schematically show the scenarios after the shift by one drive electrode.

More specifically, FIG. 9e shows signal 1 being applied to a first pair of neighbouring drive electrodes (electrodes 2 and 3) and signal 2 to the second to fourth pairs of neighbouring drive electrodes (electrodes 4 and 5, 6 and 7, and 8 and 9). This represents the scenario in FIG. 9a but shifted by one drive electrode in the direction of extent of the receive electrode 102. The signals 1 and 2 are again applied for a certain time period (T/4), and during this time, the measurement circuitry 105 makes a measurement M5 in a similar manner. However, in this case, the measurement M5 contains information indicative of the mutual capacitance at each of the offset intersection points E, F, G and H (as shown in FIGS. 9e to 9h).

Figure 9H:
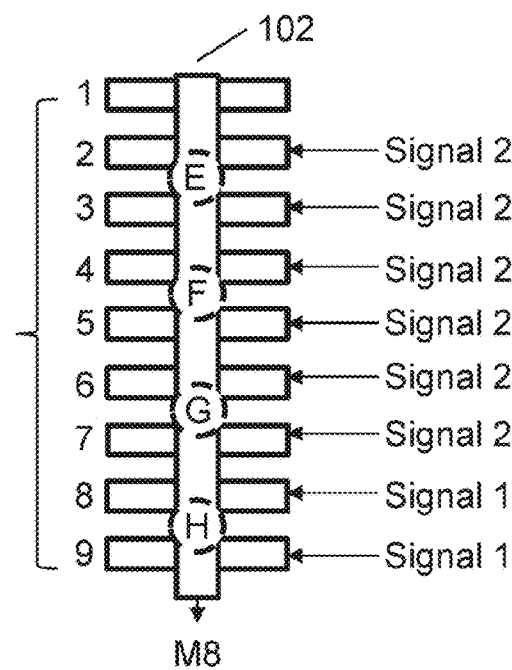

After the time period has elapsed, the measurement circuitry 105 is then configured to apply signal 1 to the second pair of drive electrodes (electrode 4 and 5) and signal 2 to the first, third and fourth pairs of drive electrodes (electrodes 2 and 3, 6 and 7, and 8 and 9), as shown in FIG. 9f. The signals 1 and 2 are again applied for a certain time period, e.g., T/4, and during this time, the measurement circuitry 105 makes a measurement M6. The process is repeated where signal 1 is applied to the third pair of drive electrodes (6 and 7) for a third time period and then to the fourth pair of drive electrodes (8 and 9) for a fourth time period, while signal 2 is applied to the remaining electrodes of the eight electrodes, and measurements M7 and M8 are made using receive electrode 102, as shown in FIGS. 9g and 9h respectively.

In a similar manner, the processing circuitry 106 is configured to determine the mutual capacitance for each of the offset intersection points E to H between the pairs of drive electrodes and receiver electrode 102, based on measurements M5 to M8, using similar equations to equations (29) to (32). With reference back to FIG. 8, essentially steps S806 and S808 are performed to obtain measurements M1 to M4 over the four different time periods as stated above, and subsequently the (four) pairs of electrodes are then shifted by one drive electrode in the direction of extent of the receive electrode 102 to perform steps S810 and S812 to obtain measurements M5 to M8. For substantially the same reasons as described above, namely to preserve spatial resolution, once a set of measurements have been performed for the initial pairs of neighbouring drive electrodes, the pairs of neighbouring drive electrodes are then shifted by one drive electrode in the direction of extent of the receiver electrode 102. More specifically, the pairs of electrodes are shifted such that one of the pair of electrodes before the shift is included in the pair of electrodes after the shift. This ensures that the spatial resolution (defined by the spatial arrangement of the drive electrodes) is maintained even though electrodes are driven as pairs. The method steps are then repeated for a new set of pairs of drive electrodes such that measurements for each drive electrode (or rather each offset intersection point) are obtained for a given receive electrode 102. More particularly, compared to the original set of electrodes (i.e., those used to obtain measurements M1 to M4 before the shift by one electrode), a new set of pairs of drive electrodes 101 that, ideally, do not overlap with the original set of pairs of drive electrodes are selected for the next set of drive electrodes used to obtain measurements M5 to M8, and so on, until measurements representing all the offset intersection points are obtained. As described previously, the process may then be repeated for each receive electrode 102 of the electrode array.

It should be appreciated that the foregoing has described the techniques applied to a "block" of neighbouring pairs of electrodes (e.g., electrodes 1 and 2 as one pair of electrodes neighbouring electrodes 3 and 4 as a second pair of electrodes, etc.). However, in principle, a given pair of electrodes does not need to neighbour another pair of electrodes to yield the desired results. Thus, in accordance with the principles of the present disclosure, a given pair of drive electrodes comprises neighbouring drive electrodes, but pairs of drive electrodes do not need to neighbour one another. The present techniques can be applied regardless of the separation between corresponding pairs of electrodes. However, it may be easier to arrange/programme the measurement circuitry 105 to drive adjacent or neighbouring pairs of neighbouring drive electrodes.

Furthermore, it should be appreciated that in some instances, depending on the number of drive electrodes that are present in the electrode array, it may not be possible to always select drive electrodes that have not previously been driven as the first set of electrodes in the scan of the electrode array. For example, supposing the electrode array comprises seventeen drive electrodes, it is possible to use electrodes 1 to 8 to obtain measurements M1 to M4 (using four pairs of neighbouring electrodes), electrodes 2 to 9 to obtain measurements M5 to M8, electrodes 9 to 16 to obtain measurements M9 to M12 and electrodes 10 to 17 to obtain measurements M13 to M16. In this instance, there is no overlap between electrodes 1 to 8 (the "original" or "initial" set of drive electrodes) and electrodes 9 to 16 (the "subsequent" set of drive electrodes). Thus, in this instance, there is no duplication of measurements made for any of the offset intersection points.

However, in the event that the electrode array comprises say sixteen drive electrodes, the above technique does not work without adaption. In this instance, the process proceeds as above but when obtaining measurements M13 to M16, one may instead drive another drive electrode not currently being driven instead of drive electrode 17 (which is not present in this example). For example, any of drive electrodes 1 to 9 may be driven instead of drive electrode 17. Following the format of equations (29) to (32), the intersection points in this example may take the form below:

$$E_{102\text{-}10\text{-}11} = M13\text{-}M14\text{-}M15\text{-}M16 \qquad (37)$$

$$E_{102\text{-}12\text{-}13} = M14\text{-}M13\text{-}M15\text{-}M16 \qquad (38)$$

$$E_{102\text{-}14\text{-}15} = M15\text{-}M13\text{-}M14\text{-}M16 \qquad (39)$$

$$E_{102\text{-}16\text{-}ANY\ OTHER} = M16\text{-}M13\text{-}M14\text{-}M15 \qquad (40)$$

The equation for the offset intersection point E102-16-ANY OTHER represents an intersection point at some position between electrode 16 and whichever other electrode is being driven. This measurement can be discarded as it, firstly, may correspond to an offset intersection point that has already been measured and, secondly, it may be distorted owing to the fact that the any source of capacitance may be detected at least between the two electrodes (or in other words, the sensing distance for this electrode is extended owing to the greater separation between the two electrodes forming the pair of electrodes).

Alternatively, it should be appreciated that the electrodes may be set in an alternative manner when performing measurements M13 to M16. For example, electrodes 8 and 9, electrodes 10 and 11, electrodes 12 and 13, and electrodes 14 and 15 may be selected as the pairs of electrodes to be driven to obtain measurements M13 to M16. In this case, it should be appreciated that the value for $E_{102-8-9}$ may have already been obtained (for example, when obtaining measurements M5 to M8), and so may be discarded by the measurement or processing circuitry 105, 106.

Hence, broadly speaking, when there exists a number of drive electrodes in the electrode array that is not equal to an integer multiple of twice the number of pairs of neighbouring drive electrodes plus one (e.g., N(2×2)+1 for two pairs of drive electrodes, or N(4×2)+1 for four pairs of drive electrodes), it may be necessary to select a further/subsequent set of pairs of drive electrodes compared to the initial set of drive electrodes that includes at least one electrode that has previously been driven in the particular scan of the electrode array.

In principle, it should also be appreciated that in the above instance it may be possible to drive only three pairs of electrodes when obtaining measurements M13 to M16 (e.g., ether by not driving electrode 16 and any other electrode as the final pair, or not driving electrodes 8 and 9). The above mathematics may need to be modified to accommodate this. However, in systems where the measurement circuitry 105 and/or processing circuitry are performed using certain hardware (such as ASICs), the system may be provided with dedicated channels for each drive electrode that is being driven—in other words, for driving in X pairs of electrodes, there may be 2X pairs of dedicated output channels from the electrode array, each comprising suitable circuitry (such as amplifiers, etc.). In this case, it is usually simpler to provide each channel with a signal than it is to not provide a signal to the unused channel. Moreover, because the signals (measurements M) are a combination of the inputs from each electrode that is being driven, the measurements M may vary in magnitude if there are only signals from e.g., seven drive electrodes versus eight drive electrodes (e.g., you might expect a reduction in the magnitude of the measurement M when only seven electrodes are driven). Thus, to maintain the balance of the circuitry, it may be beneficial to drive a total of 4X drive electrodes whenever a measurement is to be made. This may mean that the hardware components of the circuitry do not need to be adapted during use (e.g., switching from operating when eight electrodes are being driven to when seven electrodes are being driven).

It should be appreciated that the present techniques can be extended to driving any suitable number of pairs of drive electrodes (e.g., two, four, eight, sixteen, etc.), using the principles as described above. Driving pairs of drive electrodes, as opposed to single drive electrodes, increases the signal strength received at the measurement circuitry 105 and therefore increases the signal to noise ratio achievable using this technique, as described above.

Furthermore, the above description has focused on implementations where drive signals are applied to pairs of electrodes. However, in principle, the technique can be applied to situations where drive signals are applied to any other numbered group of drive electrodes, e.g., 3, 4, 5, etc. For example, with reference to FIG. 7a, one may apply the first drive signal 1 to a group of four drive electrodes, e.g., drive electrodes 1 to 4, and a second drive signal 2 to a neighbouring group of four electrodes, e.g., drive electrodes 5, 6 and not shown electrodes 7 and 8). In this instance, it should be appreciated that a total of eleven electrodes are required to perform the necessary measurements following the pattern of FIGS. 7a to 7d. In this regard, it should be appreciated that although four drive electrodes may be driven by the same signal simultaneously, the offset intersection point is the spatial mid-point of the group of driven electrodes. In other words, driving electrodes 1 to 4 as the first pair, and electrodes 5 to 8 as the second pair, only provides measurements associated with two offset intersection points (and these would be the intersection points between electrodes 2 and 3 for the first pair, and 6 and 7 for the second pair). To obtain information of the offset intersection points between electrodes 3 and 4 and 7 and 8, the groups of four electrodes must be shifted by one electrode once, and to obtain information of the offset intersection points between electrodes 4 and 5 and 8 and 9, the groups of four electrodes must be shifted again by one electrode, and finally to obtain information of the offset intersection points between electrodes 5 and 6 and 9 and 10, the groups of four electrodes must be shifted again by one electrode. Broadly speaking, for a given group of G drive electrodes that are driven by a common drive signal, the group is required to be shifted G-1 times to obtain measurements of all the offset intersection points that that group of G drive electrodes covers (or more specifically, the two groups of G drive electrodes, as the technique of FIG. 7 requires a first group and a second group). Additionally, and for certainty, this means the steps S810 and S812 in FIG. 8 will need to be performed G-1 times.

It should also be appreciated that increasing the number of drive electrodes per group also increases the distance from the closest offset intersection point to the edge drive electrode to the edge drive electrode. For instance, taking the example above where four drive electrodes 1 to 4 form a first group of electrodes that the drive signal is applied to, and assuming the edge drive electrode of the electrode array is electrode 1, the closest offset intersection point using the technique as described above for which a measurement of the mutual capacitance is possible is that which lies between electrodes 2 and 3. It is not possible to obtain a measure of the mutual capacitance of the offset intersection point between electrodes 1 and 2 using a group of four electrodes. This means increasing the number of drive electrodes in a group, decreases the effective sensing area of the electrode array. In addition, increasing the number of drive electrodes in a given group can also lead to difficulties in distinguishing the locations of a genuine touch or object. For example, using the example above where four drive electrodes 1 to 4 form a first group of electrodes, a touch located above electrodes 1, 2, 3, and 4 is detected in (or rather, influences) the value indicative of the mutual capacitance at the offset intersection point between electrodes 2 and 3.

Thus, operating with pairs of electrodes (i.e., a group of two) may be considered to provide a good compromise between flexibility and achievable signal strength (noting that the signal strength achievable for a capacitance measurement is proportional to the number of electrodes in the group at least for relatively smaller numbers of electrodes in the group). This is particularly the case when the width of the drive electrodes is relatively small and/or when the pitch (distance between electrodes) is relatively small. More particularly, when the space that the electrodes occupy (e.g., in the direction of the pitch of the electrodes), is of the order of the size of a user's finger, then the described approach offers benefits in terms of the signal to noise ratio achievable. If one assumes that the approximate contact area of a finger on the touch sensitive surface has an extent in either the X direction or Y direction of around 10 mm, then for a group of X electrodes, the benefits of the present technique may be especially realised when the number of electrodes per group multiplied by the width of the electrode (X×W) plus the number of electrodes per group multiplied by the pitch between electrodes (X×P) is equal to or less than 10 mm (although satisfactory results depending on the application at hand may also be achieved when the number of electrodes per group multiplied by the width of the electrode (X×W) plus the number of electrodes per group multiplied by the pitch between electrodes (X×P) is equal to or less than 20 mm, or equal to or less than 15 mm).

Further, it should be appreciated that while the drive signal is described as a sinusoidal signal (either signal 1 or signal 2), the principles of the described technique are equally applicable to other signal waveforms for which an inverse waveform of signal 1 can be generated as signal 2, e.g., a square wave, whereby the inverse signal varies in opposition to the initial signal.

Thus there has been described a touch-sensitive apparatus including a plurality of drive electrodes; a receiver electrode; drive circuitry configured to generate a first time-varying voltage signal and a second time-varying voltage signal, wherein the first and second time-varying voltage signals are the inverse of one another; and control circuitry. The control circuitry is configured to: apply at least one of the first time-varying voltage signal and the second time-varying voltage signal to a first group of neighbouring drive electrodes for a first time period; apply at least one of the first time-varying voltage signal and the second time-varying voltage signal to a second group of neighbouring drive electrodes for the first time period; perform a first measurement on the receiver electrode during the first time period; apply at least one of the first time-varying voltage signal and the second time-varying voltage signal to the first group of neighbouring drive electrodes for a second time period; apply at least one of the first time-varying voltage signal and the second time-varying voltage signal to the second group of drive electrodes for the second time period, wherein the time-varying voltage signal applied to at least one of the first group and second group of neighbouring drive electrodes during the first time period is different from the time-varying voltage signal applied to the at least one of the first group and second group of neighbouring drive electrodes during the second time period; perform a second measurement on the receiver electrode during the second time period; and determine a resultant signal corresponding to the mutual capacitance between the first group of neighbouring drive electrodes and the receiver electrode based on both the first measurement and the second measurement. Further described is a corresponding method for determining the presence of a touch on a touch-sensitive element.

Further particular and preferred aspects of the present invention are set out in the accompanying independent and dependent claims. It will be appreciated that features of the dependent claims may be combined with features of the independent claims in combinations other than those explicitly set out in the claims.

The invention claimed is:

1. A touch-sensitive apparatus, the apparatus comprising:
a plurality of drive electrodes;
a receiver electrode;
drive circuitry configured to generate a first time-varying voltage signal and a second time-varying voltage signal, wherein the first and second time-varying voltage signals are the inverse of one another; and
control circuitry configured to:
apply at least one of the first time-varying voltage signal and the second time-varying voltage signal to a first group of neighbouring drive electrodes for a first time period;
apply at least one of the first time-varying voltage signal and the second time-varying voltage signal to a second group of neighbouring drive electrodes for the first time period;
perform a first measurement on the receiver electrode during the first time period;
apply at least one of the first time-varying voltage signal and the second time-varying voltage signal to the first group of neighbouring drive electrodes for a second time period;
apply at least one of the first time-varying voltage signal and the second time-varying voltage signal to the second group of drive electrodes for the second time period, wherein the time-varying voltage signal applied to at least one of the first group and second group of neighbouring drive electrodes during the first time period is different from the time-varying voltage signal applied to the at least one of the first group and second group of neighbouring drive electrodes during the second time period;
perform a second measurement on the receiver electrode during the second time period; and
determine a resultant signal corresponding to the mutual capacitance between the first group of neighbouring drive electrodes and the receiver electrode based on both the first measurement and the second measurement.

2. The touch-sensitive apparatus of claim 1, wherein the control circuitry is configured to determine a resultant signal corresponding to the mutual capacitance between the second group of neighbouring drive electrodes and the receiver electrode based on both the first measurement and the second measurement.

3. The touch-sensitive apparatus of claim 2, wherein, in at least one of the first time period and the second time period, the control circuitry is configured to supply the first time-varying voltage signal to the first group of neighbouring electrodes or the second group of neighbouring drive electrodes and to supply the second time-varying voltage signal to the other of the first group of neighbouring drive electrodes or the second group of neighbouring drive electrodes.

4. The touch-sensitive apparatus of claim 1, wherein the first group of neighbouring drive electrodes and the second group of neighbouring drive electrodes comprise different drive electrodes.

5. The touch-sensitive apparatus of claim 1, wherein the first group of neighbouring drive electrodes neighbours the second group of neighbouring drive electrodes.

6. The touch-sensitive apparatus of claim 1, wherein the first group of neighbouring drive electrodes and the second group of neighbouring drive electrodes each consist of a pair of neighbouring drive electrodes.

7. The touch-sensitive apparatus of claim 1, wherein a combination of the width of each drive electrode and the pitch between drive electrodes for the first and/or second group of neighbouring drive electrodes is less than or equal to a predetermined value indicative of the areal extent of an object to be sensed on by the touch-sensitive apparatus.

8. The touch-sensitive apparatus of claim 1, wherein the control circuitry is further configured to:
apply at least one of the first time-varying voltage signal and the second time-varying voltage signal to a third group of neighbouring drive electrodes for a third time period;
apply at least one of the first time-varying voltage signal and the second time-varying voltage signal to a fourth group of neighbouring drive electrodes for the third time period;
perform a third measurement on the receiver electrode during the third time period;
apply at least one of the first time-varying voltage signal and the second time-varying voltage signal to the third group of neighbouring drive electrodes for a fourth time period;
apply at least one of the first time-varying voltage signal and the second time-varying voltage signal to the fourth group of drive electrodes for the fourth time period, wherein the time-varying voltage signal applied to at least one of the third group and fourth group of neighbouring drive electrodes during the third time period is different from the time-varying voltage signal applied to the at least one of the third group and fourth group of neighbouring drive electrodes during the fourth time period;
perform a fourth measurement on the receiver electrode during the fourth time period; and
determine a resultant signal corresponding to the mutual capacitance between the third group of neighbouring drive electrodes and the receiver electrode based on both the third measurement and the fourth measurement.

9. The touch-sensitive apparatus of claim 8, wherein the control circuitry is configured to determine a resultant signal corresponding to the mutual capacitance between the fourth group of neighbouring drive electrodes and the receiver electrode based on both the third measurement and the fourth measurement.

10. The touch-sensitive apparatus of claim 8, wherein the third group of neighbouring drive electrodes comprises at least one drive electrode of the first group of neighbouring drive electrodes, and the fourth group of neighbouring drive electrodes comprises at least one drive electrode of the second group of neighbouring drive electrodes.

11. The touch-sensitive apparatus of claim 10, wherein the third group of neighbouring drive electrodes comprises neighbouring electrodes which have been shifted by one drive electrode in the direction of extent of the receiver electrode as compared to the neighbouring drive electrodes comprising the first group of drive electrodes, and the fourth group of neighbouring drive electrodes comprises neighbouring electrodes which have been shifted by one drive electrode in the direction of extent of the receiver electrode as compared to the neighbouring drive electrodes comprising the second group of drive electrodes.

12. The touch-sensitive apparatus of claim 8, wherein each of the first, second, third and fourth group of neighbouring drive electrodes each consist of a pair of neighbouring drive electrodes.

13. The touch-sensitive apparatus of claim 8, wherein the control circuitry is further configured to:
apply at least one of the first time-varying voltage signal and the second time-varying voltage signal to a fifth group of neighbouring drive electrodes for a fifth time period;
apply at least one of the first time-varying voltage signal and the second time-varying voltage signal to a sixth group of neighbouring drive electrodes for the fifth time period;
perform a fifth measurement on the receiver electrode during the fifth time period;
apply at least one of the first time-varying voltage signal and the second time-varying voltage signal to the fifth group of neighbouring drive electrodes for a sixth time period;
apply at least one of the first time-varying voltage signal and the second time-varying voltage signal to the sixth group of drive electrodes for the sixth time period, wherein the time-varying voltage signal applied to at least one of the fifth group and sixth group of neighbouring drive electrodes during the fifth time period is different from the time-varying voltage signal applied to the at least one of the fifth group and sixth group of neighbouring drive electrodes during the sixth time period;
perform a sixth measurement on the receiver electrode during the sixth time period; and
determine a resultant signal corresponding to the mutual capacitance between the fifth group of neighbouring drive electrodes and/or the sixth group of neighbouring drive electrodes and the receiver electrode based on both the fifth measurement and the sixth measurement.

14. The touch-sensitive apparatus of claim 13, wherein the fifth group of neighbouring drive electrodes and the sixth group of neighbouring drive electrodes comprise drive electrodes that are different from the drive electrodes comprising the first group of neighbouring drive electrodes and the second group of neighbouring drive electrodes.

15. The touch-sensitive apparatus of claim 13, wherein when the number of drive electrodes between the drive electrode of the first or second group of neighbouring electrodes that is closest to an edge of an electrode array comprising the plurality of drive electrodes and the receiver electrode in the direction of extent of the receiver electrode is less than the number of drive electrodes in the first and second groups of neighbouring drive electrodes, the control circuitry is configured to assign at least one drive electrode of the first and/or second group of neighbouring drive electrodes to the fifth or sixth group of neighbouring drive electrodes.

16. The touch-sensitive apparatus of claim 1, wherein the control circuitry is configured to determine the presence of a touch at an intersection between the first group of neighbouring drive electrodes and the receiver electrode by comparing the difference between the resultant signal corresponding to the mutual capacitance between the first group of neighbouring drive electrodes and the receiver electrode and a signal corresponding to the mutual capacitance between the first group of neighbouring drive electrodes and the receiver electrode obtained in the absence of a touch to a predetermined threshold.

17. A system comprising the touch-sensitive apparatus of claim 1, further comprising system processing circuitry communicatively coupled to the processing circuitry of the touch-sensitive apparatus.

18. A method for determining the presence of a touch on a touch-sensitive element of a touch-sensitive apparatus, the apparatus comprising a plurality of drive electrodes, and a receiver electrode, wherein the method comprises:

generating a first time-varying voltage signal and a second time-varying voltage signal, wherein the first and second time-varying voltage signals are the inverse of one another;

applying at least one of the first time-varying voltage signal and the second time-varying voltage signal to a first group of neighbouring drive electrodes for a first time period;

applying at least one of the first time-varying voltage signal and the second time-varying voltage signal to a second group of neighbouring drive electrodes for the first time period;

performing a first measurement on the receiver electrode during the first time period;

applying at least one of the first time-varying voltage signal and the second time-varying voltage signal to the first group of neighbouring drive electrodes for a second time period;

applying at least one of the first time-varying voltage signal and the second time-varying voltage signal to the second group of drive electrodes for the second time period, wherein the time-varying voltage signal applied to at least one of the first group and second group of neighbouring drive electrodes during the first time period is different from the time-varying voltage signal applied to the at least one of the first group and second group of neighbouring drive electrodes during the second time period;

performing a second measurement on the receiver electrode during the second time period; and determining a resultant signal corresponding to the mutual capacitance between the first group of neighbouring drive electrodes and the receiver electrode based on both the first measurement and the second measurement.

* * * * *